United States Patent
McKay

(10) Patent No.: US 8,121,577 B1
(45) Date of Patent: Feb. 21, 2012

(54) CONTROLLABLE INPUT IMPEDANCE RADIO FREQUENCY MIXER

(75) Inventor: Thomas Gregory McKay, Boulder Creek, CA (US)

(73) Assignee: RF Micro Devices, Inc., Greensboro, NC (US)

( * ) Notice: Subject to any disclaimer, the term of this patent is extended or adjusted under 35 U.S.C. 154(b) by 987 days.

(21) Appl. No.: 12/100,010

(22) Filed: Apr. 9, 2008

Related U.S. Application Data

(60) Provisional application No. 60/910,730, filed on Apr. 9, 2007.

(51) Int. Cl.
*H04B 1/26* (2006.01)

(52) U.S. Cl. ........ 455/326; 455/293; 455/302; 455/307; 327/254; 327/256; 327/359

(58) Field of Classification Search .................. 455/302, 455/307, 293, 326; 330/252, 282; 327/254, 327/256, 259
See application file for complete search history.

(56) References Cited

U.S. PATENT DOCUMENTS

| | | | |
|---|---|---|---|
| 6,366,166 B1 * | 4/2002 | Belot | 330/252 |
| 6,388,525 B1 * | 5/2002 | Bien | 330/282 |
| 7,043,220 B1 * | 5/2006 | Ciubotaru | 455/302 |
| 7,271,647 B2 * | 9/2007 | Cao et al. | 327/552 |
| 7,327,997 B2 * | 2/2008 | Chandra et al. | 455/307 |
| 7,424,281 B1 * | 9/2008 | Duggan | 455/302 |
| 7,750,749 B2 * | 7/2010 | Jones | 332/105 |

OTHER PUBLICATIONS

Cook, Ben W. et al., "Low-Power 2.4-GHz Transceiver with Passive RX Front-End and 400-mV Supply," IEEE Journal of Solid-State Circuits, Dec. 2006, pp. 2757-2766, vol. 41, No. 12, IEEE.

* cited by examiner

*Primary Examiner* — Junpeng Chen
(74) *Attorney, Agent, or Firm* — Withrow & Terranova, P.L.L.C.

(57) ABSTRACT

The present invention is a controllable input impedance RF mixer, which when fed from a high impedance source, such as a current source, provides a high quality factor (Q) impedance response associated with an impedance peak. The high-Q impedance response may be used as a high-Q RF bandpass filter in a receive path upstream of down conversion, which may improve receiver selectivity and replace surface acoustic wave (SAW) or other RF filters. The present invention uses polyphase reactive circuitry, such as capacitive elements, coupled to the down conversion outputs of an RF mixer. The RF mixer mixes RF input signals with local oscillator signals to translate the impedance of the polyphase reactive circuitry into the RF input impedance of the RF mixer. The RF input impedance includes at least one impedance peak. The local oscillator signals are non-overlapping to maximize the energy transferred to the polyphase reactive circuitry.

24 Claims, 22 Drawing Sheets

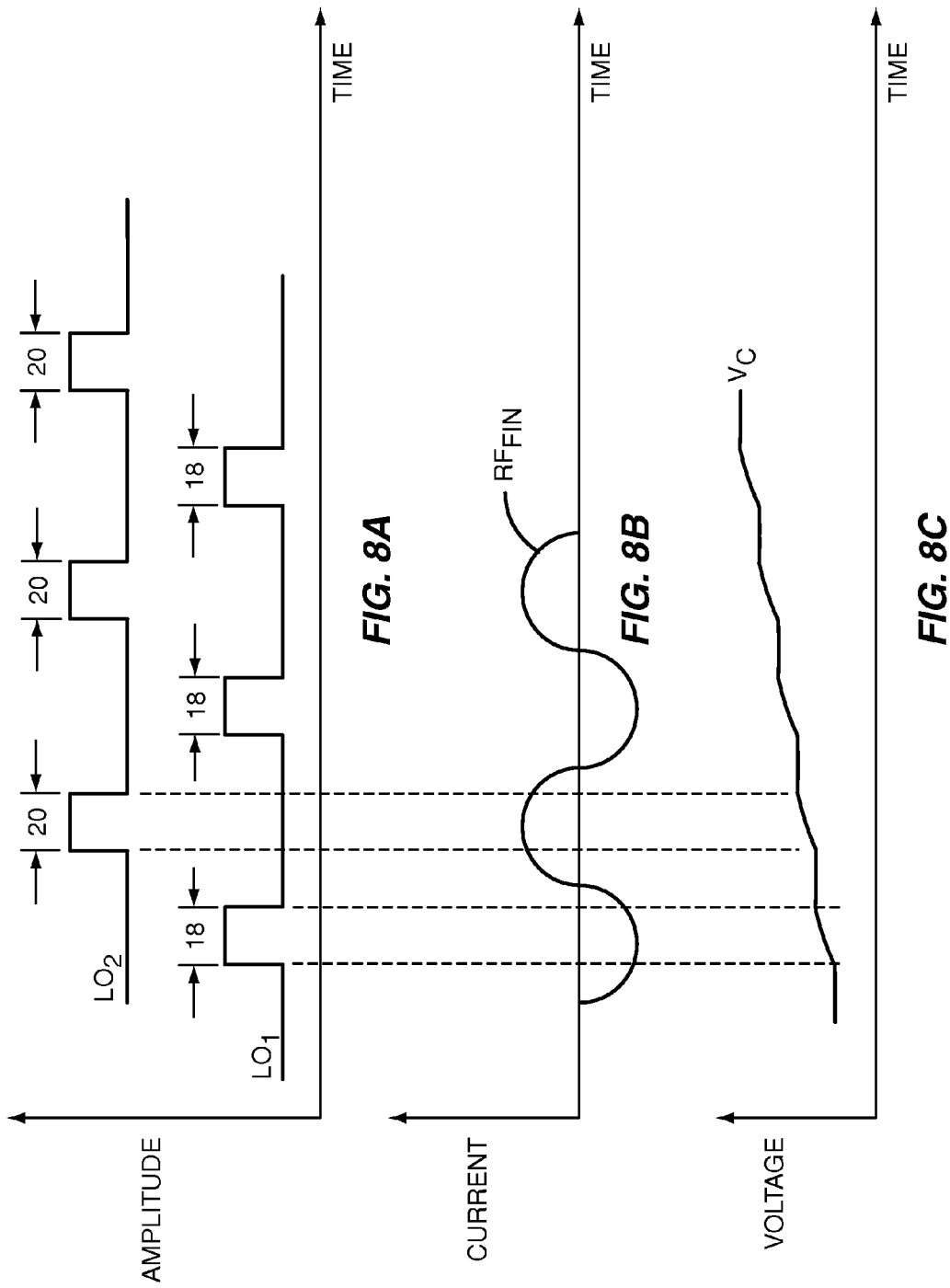

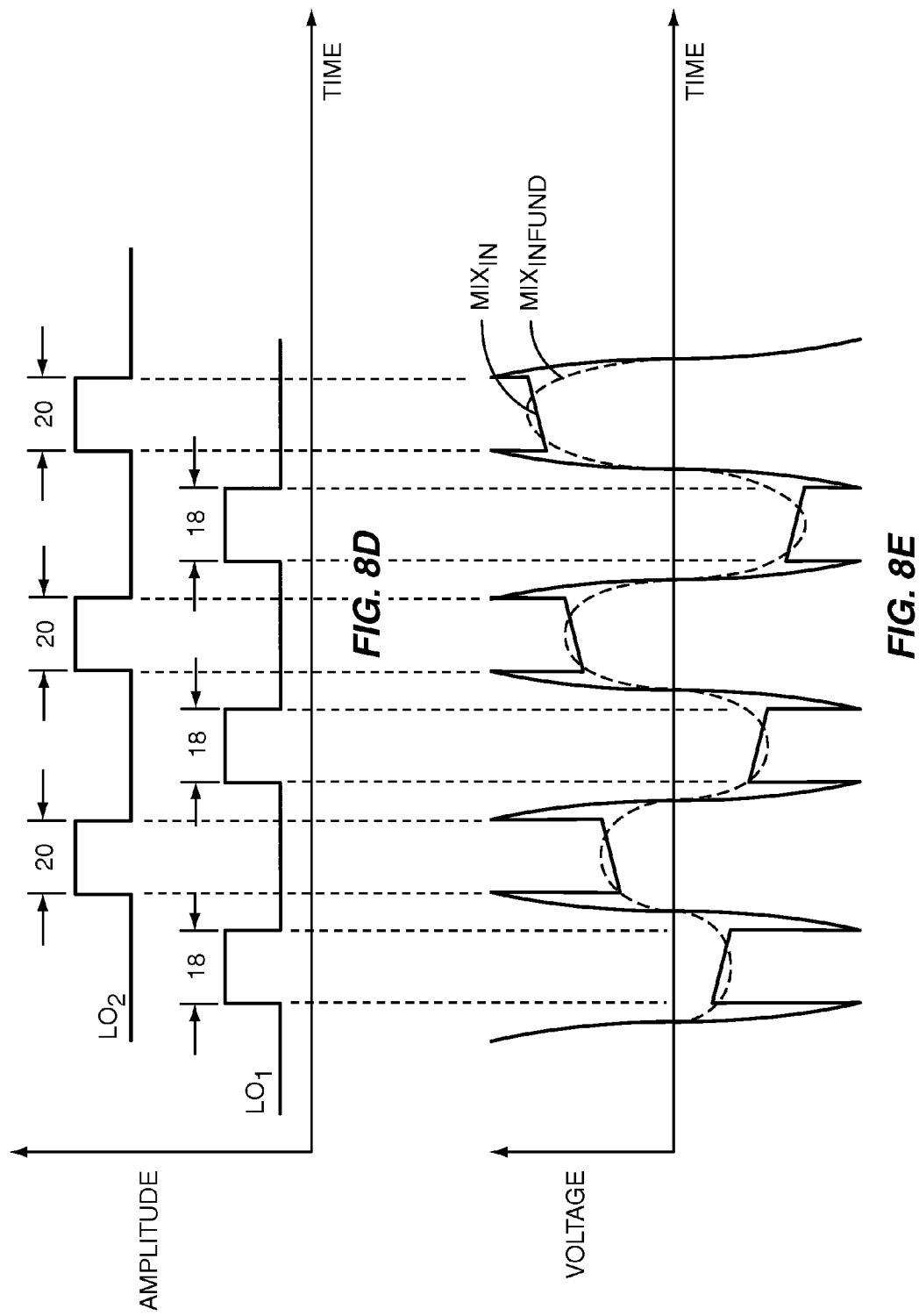

CONTROLLABLE INPUT IMPEDANCE RADIO FREQUENCY MIXER

This application claims the benefit of provisional patent application Ser. No. 60/910,730, filed Apr. 9, 2007, the disclosure of which is hereby incorporated by reference in its entirety.

FIELD OF THE INVENTION

The present invention relates to radio frequency (RF) mixers and filters used in RF communications equipment, such as RF receivers.

BACKGROUND OF THE INVENTION

Many typical RF communications systems have RF receivers that need to receive a desired RF signal on a specific RF channel, which is a desired RF channel that has a desired bandwidth and a desired RF center frequency. One function of the RF receiver is to reject any RF signals at frequencies other than those within the desired bandwidth of the desired RF channel; therefore, numerous filtering and signal rejection techniques have been developed to achieve this function. One such technique is called super-heterodyning, in which received RF signals are filtered and then mixed with a local oscillator signal to down convert the filtered RF signals into lower frequency signals, which are known as intermediate frequency (IF) signals. The mixing down converts a desired RF signal into a desired IF signal having a desired IF center frequency. Generally, it is easier to filter out unwanted signals at IF frequencies than at higher RF frequencies; however, mixers have a characteristic that produces image signals in addition to desired signals. Image signals may be removed by RF filtering, IF filtering, or both. Bandpass filtering may be used to pass desired signals and remove interfering signals. Notch filtering may be used to target and reduce interfering signals at specific frequencies. The quality factor of a bandpass filter is a measure of the effectiveness of the filter at removing interfering signals at nearby frequencies, and is the bandwidth of the filter divided by the center frequency of the filter.

Some RF communications protocols include as many channels as possible in a given bandwidth; therefore, channel spacing may be tight. To reduce interference from adjacent and alternate channels, the bandwidth of the filtering needs to be as narrow as possible, which may be difficult at RF frequencies; however, filtering out interfering signals before down conversion is preferable to reduce image problems and reduce the magnitude of interfering signals that must be handled by down conversion and downstream circuitry. Thus, there is a need for a narrow bandwidth RF bandpass filter having a high quality factor.

SUMMARY OF THE INVENTION

The present invention relates to a controllable input impedance RF mixer, which when fed from a high impedance source, such as a current source, provides a high quality factor (Q) impedance response associated with an impedance peak. The high-Q impedance response may be used as a high-Q RF bandpass filter in a receive path upstream of down conversion, which may improve receiver selectivity and replace surface acoustic wave (SAW) or other RF filters. The present invention uses polyphase reactive circuitry, such as capacitive elements, coupled to the down conversion outputs of an RF mixer. The RF mixer mixes RF input signals with local oscillator signals to translate the impedance of the polyphase reactive circuitry into the RF input impedance of the RF mixer. The RF input impedance includes at least one impedance peak. The local oscillator signals are non-overlapping to maximize the energy transferred to the polyphase reactive circuitry and eliminate signal losses associated with overlapping phases.

In some embodiments of the present invention, the polyphase reactive circuitry includes at least one capacitive element. The RF input impedance peak presented to RF input signals at the same phase and frequency of the local oscillator signals may theoretically approach infinity. Losses from the RF mixer, the polyphase reactive circuitry, and the source impedance feeding the RF mixer determine the quality factor (Q) of the impedance peak of the circuit. Alternate embodiments of the present invention may enhance the polyphase reactive circuitry with transconductance circuitry to shift the impedance peak away from the local oscillator frequency to center the bandpass response around a desired receive frequency.

Some embodiments of the present invention may use a quadrature RF mixer and polyphase reactive circuitry, which may be used to create an impedance peak independent of the phase difference of the local oscillator and the RF input signals. Additionally, quadrature mixing may be used to create complex RF filtering that may include at least one bandpass filter response, at least one notch filter response, or both. Transconductance circuitry may be incorporated into the polyphase reactive circuitry to create additional filter types. The RF mixer and polyphase reactive circuitry may use differential signals. The RF mixer may be a passive RF mixer, or an RF mixer that behaves in a similar manner to a passive RF mixer. The combination of passive RF mixer circuitry and polyphase reactive circuitry results in low energy loss, which may provide very low voltage mode conversion losses, and low 1/f noise and low thermal noise. In one embodiment of the present invention, the RF mixer and polyphase reactive circuitry is fed from a source impedance to create a stand-alone RF filter, which may be coupled into an RF signal path. The source impedance may be provided from an output impedance of a low noise amplifier (LNA). In an alternate embodiment of the present invention, the RF mixer provides a down conversion function in an RF receiver in addition to providing RF filter functionality. The down conversion outputs from the RF mixer are coupled to downstream circuitry to provide down converted received data. A source impedance may be provided from an output impedance of an LNA.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

Figure 2:
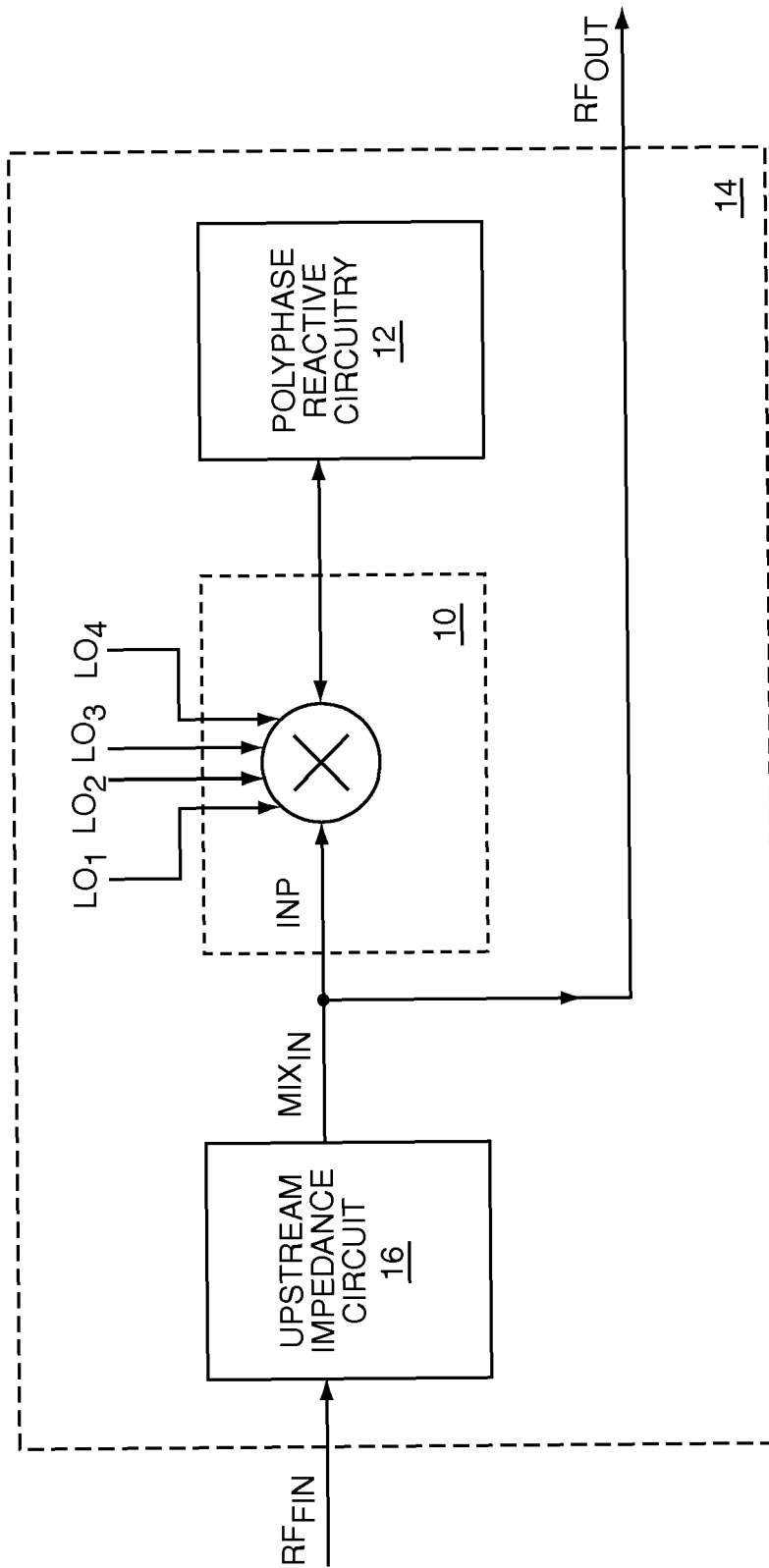
FIG. 2 shows the RF mixer and polyphase reactive circuitry illustrated in FIG. 1 used in an RF bandpass filter.
Figure 3:
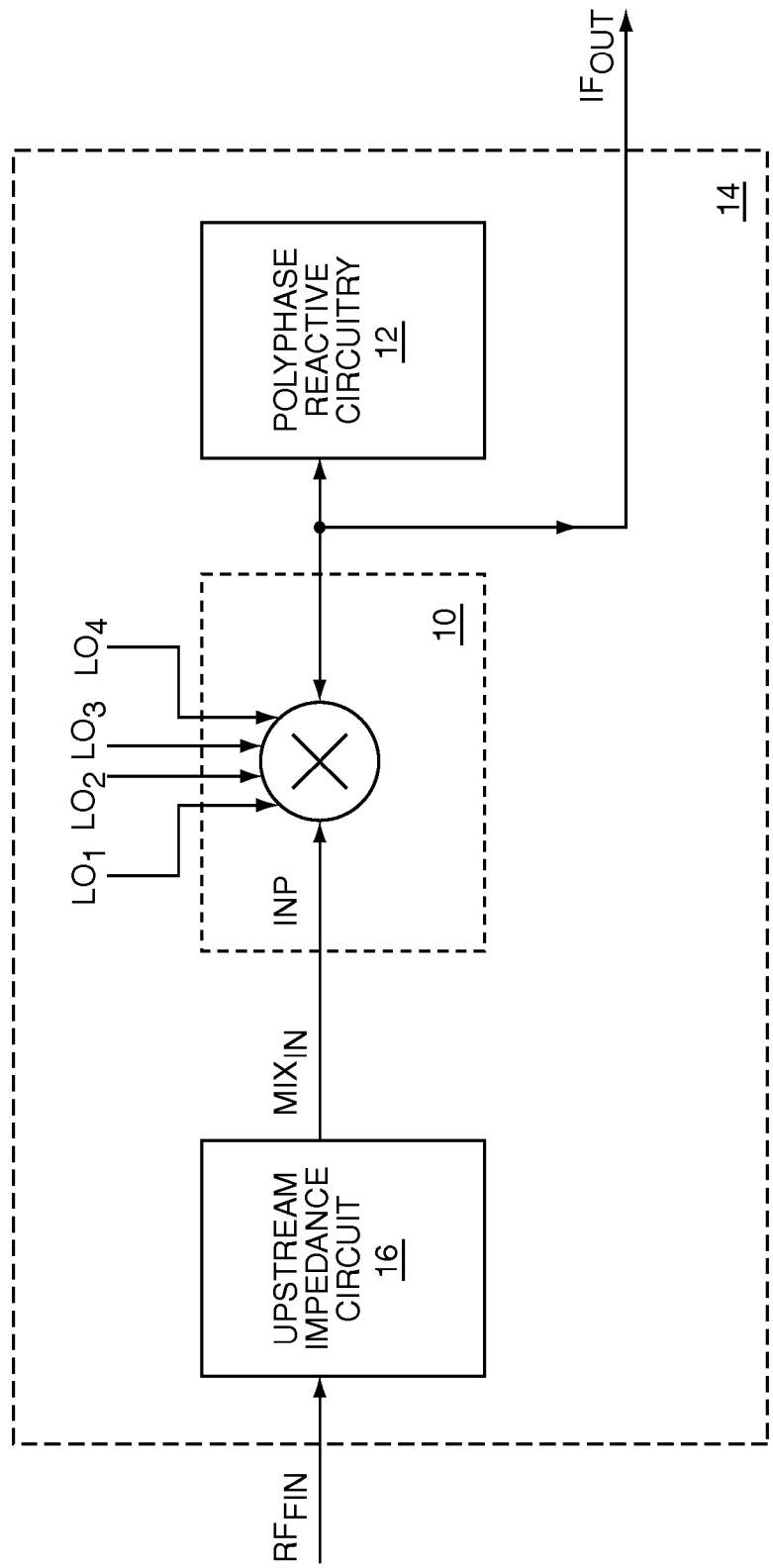

FIG. 3 adds an IF output to the RF bandpass filter illustrated in FIG. 2.

Figure 1:
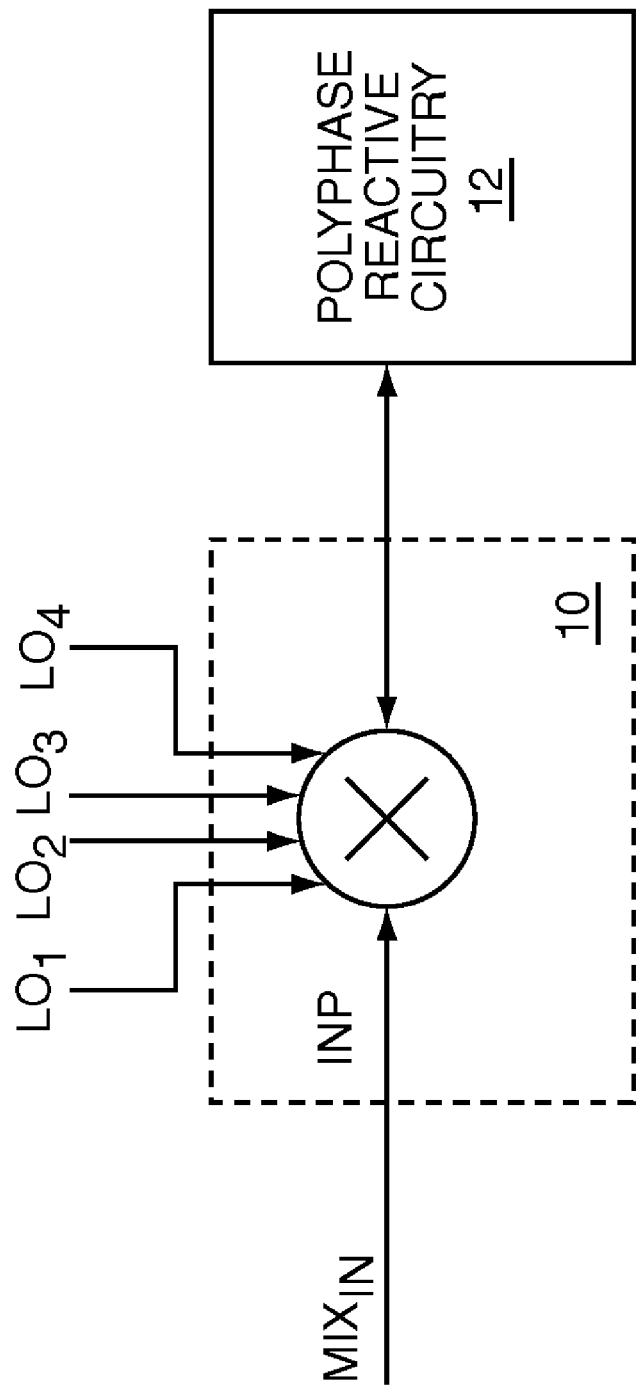
FIG. 1 shows an RF mixer coupled to polyphase reactive circuitry according to one embodiment of the present invention.
Figure 4:
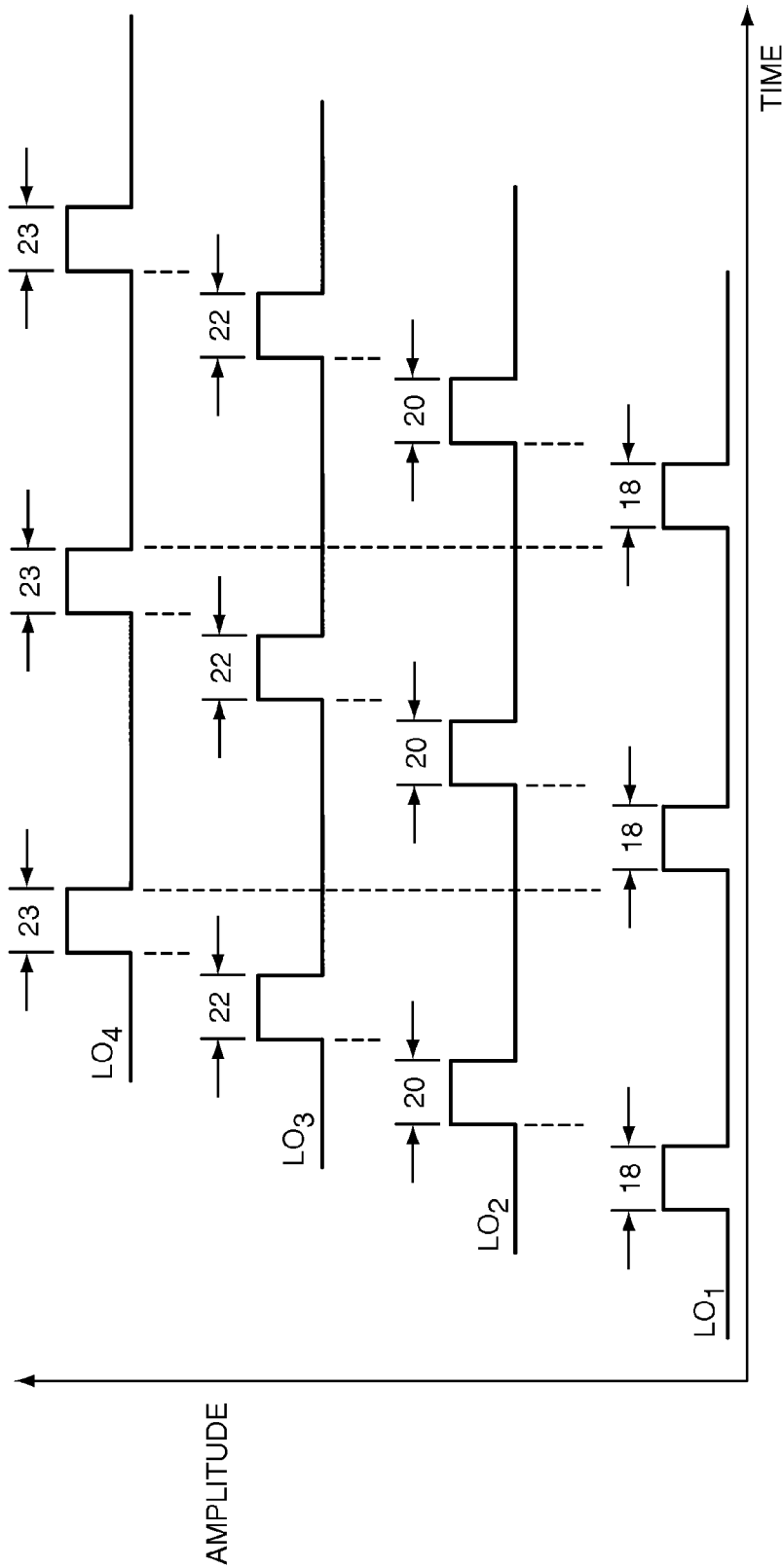

FIG. 4 is a graph showing the timing relationships of the local oscillator signals illustrated in FIG. 1.

Figure 5:
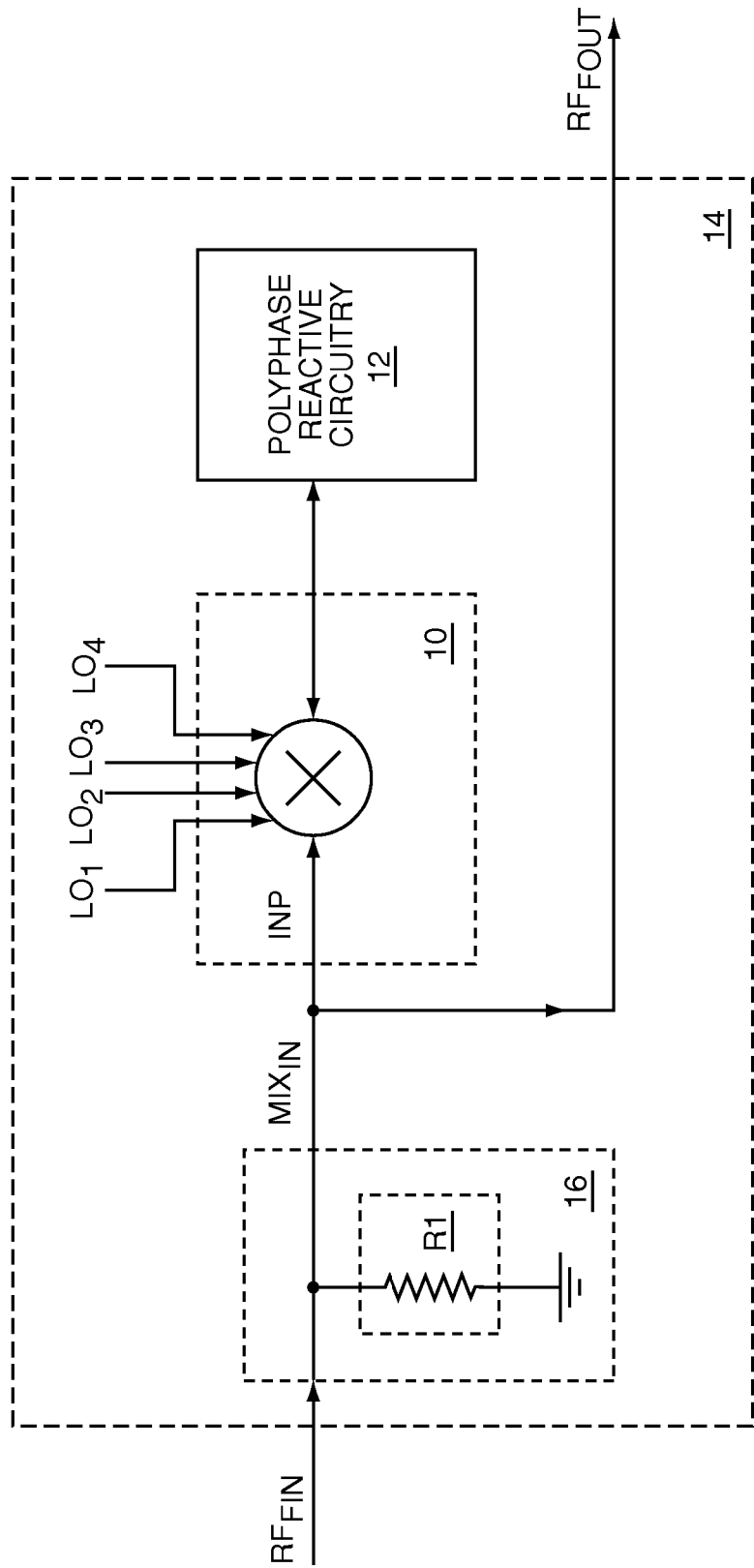

FIG. 5 shows a resistive element used in the upstream impedance circuit illustrated in FIG. 2.

Figure 6:
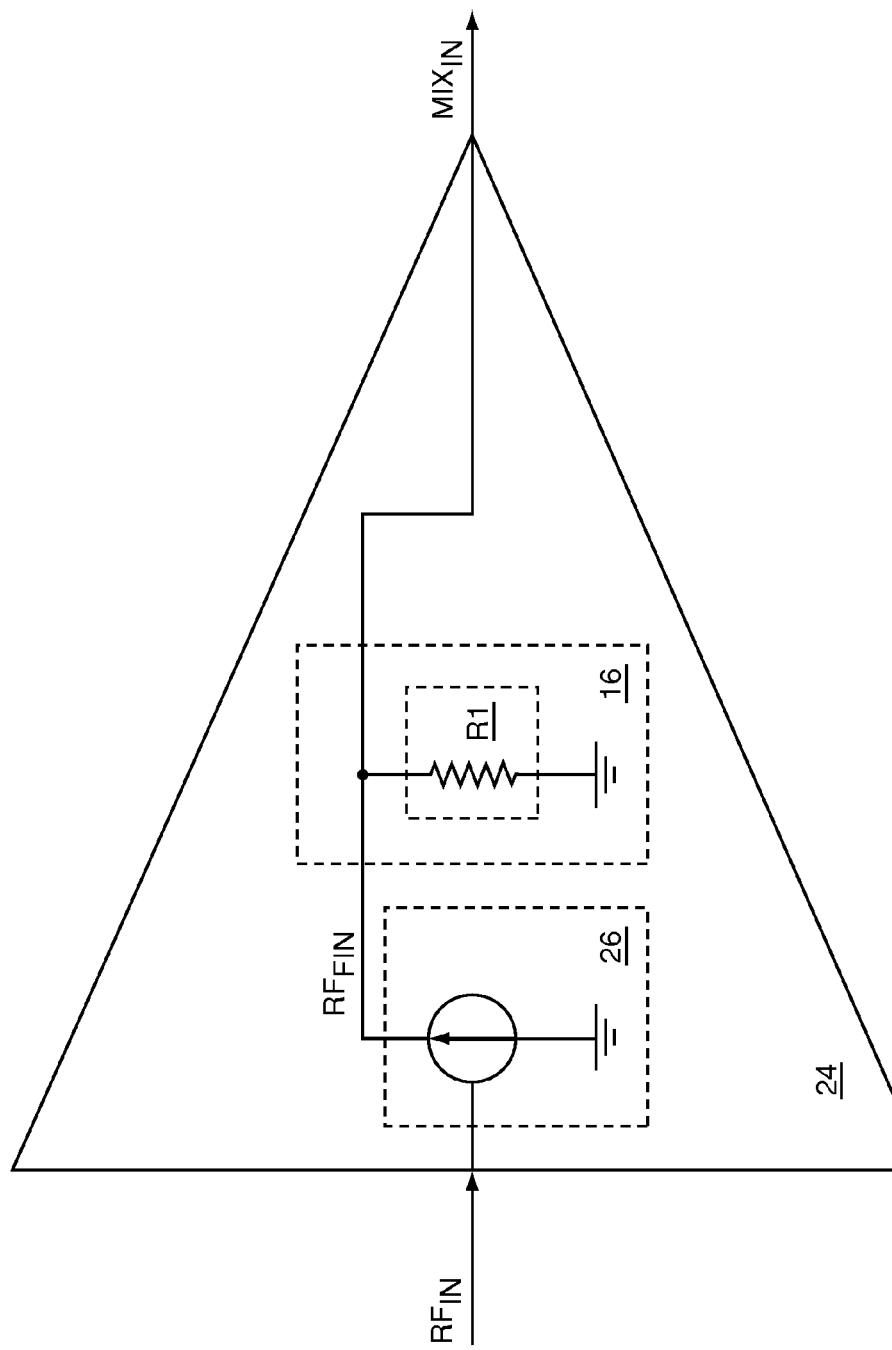

FIG. 6 shows the upstream impedance circuit illustrated in FIG. 5 as part of an LNA.

Figure 7:
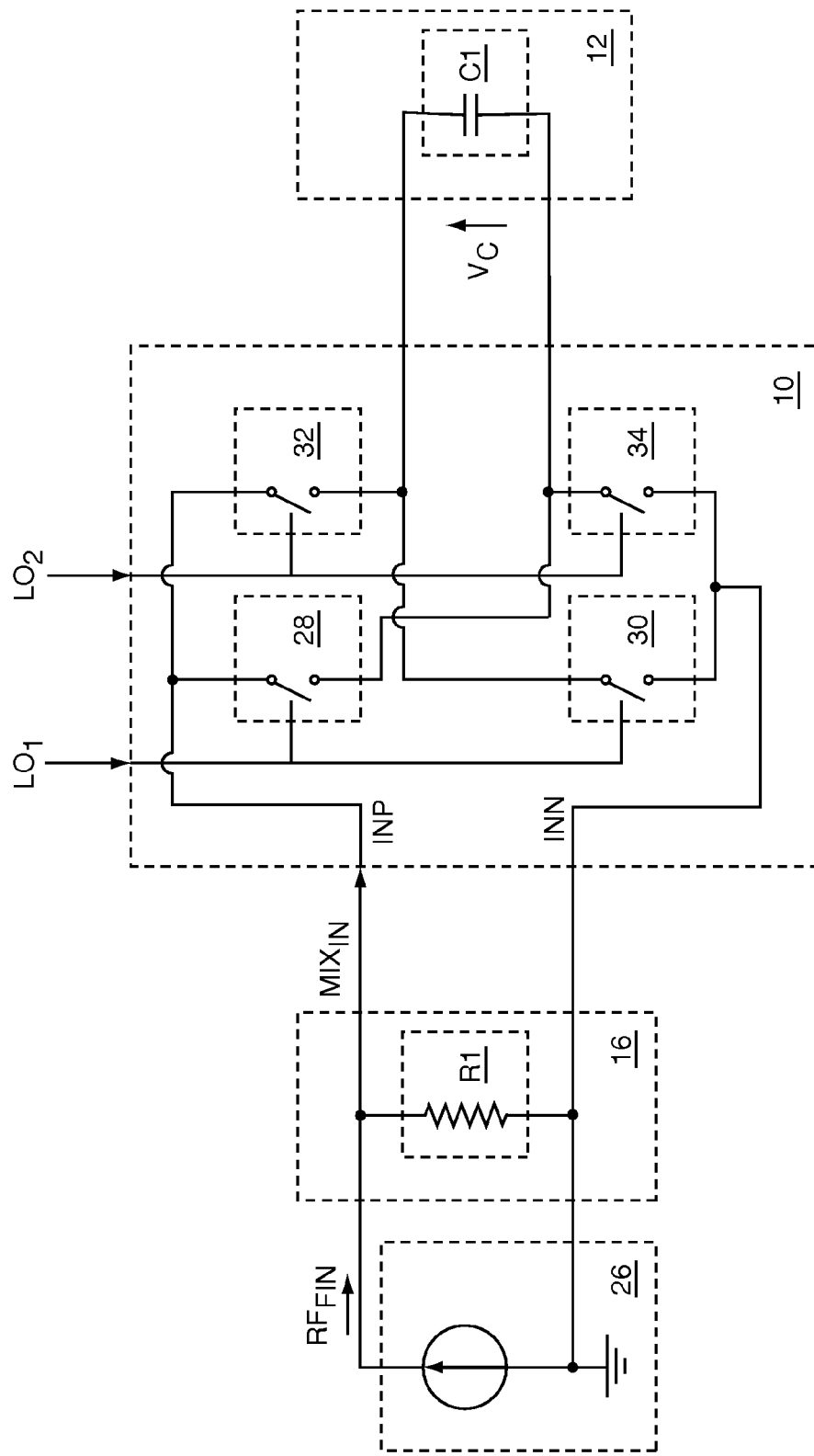

FIG. 7 illustrates a detailed embodiment of the present invention.

FIGS. 8A, 8B, 8C, 8D, and 8E are graphs showing the behavior of some of the signals illustrated in FIG. 7.

Figure 9:
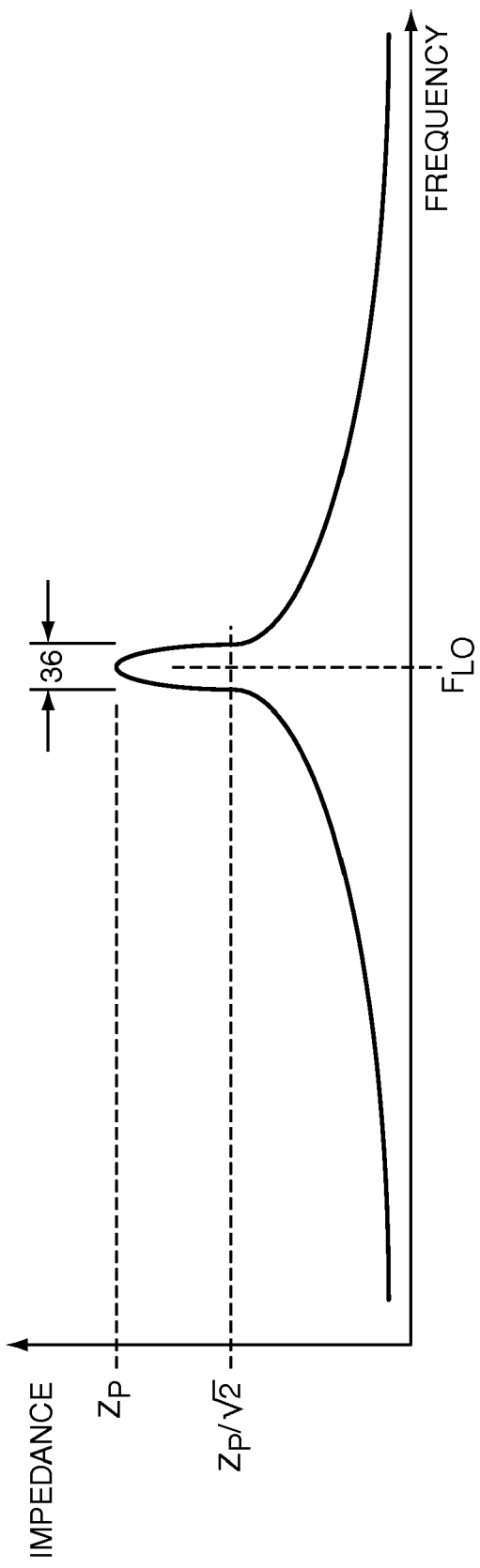

FIG. 9 is a graph showing the impedance behavior of the detailed embodiment illustrated in FIG. 7.

Figure 10:
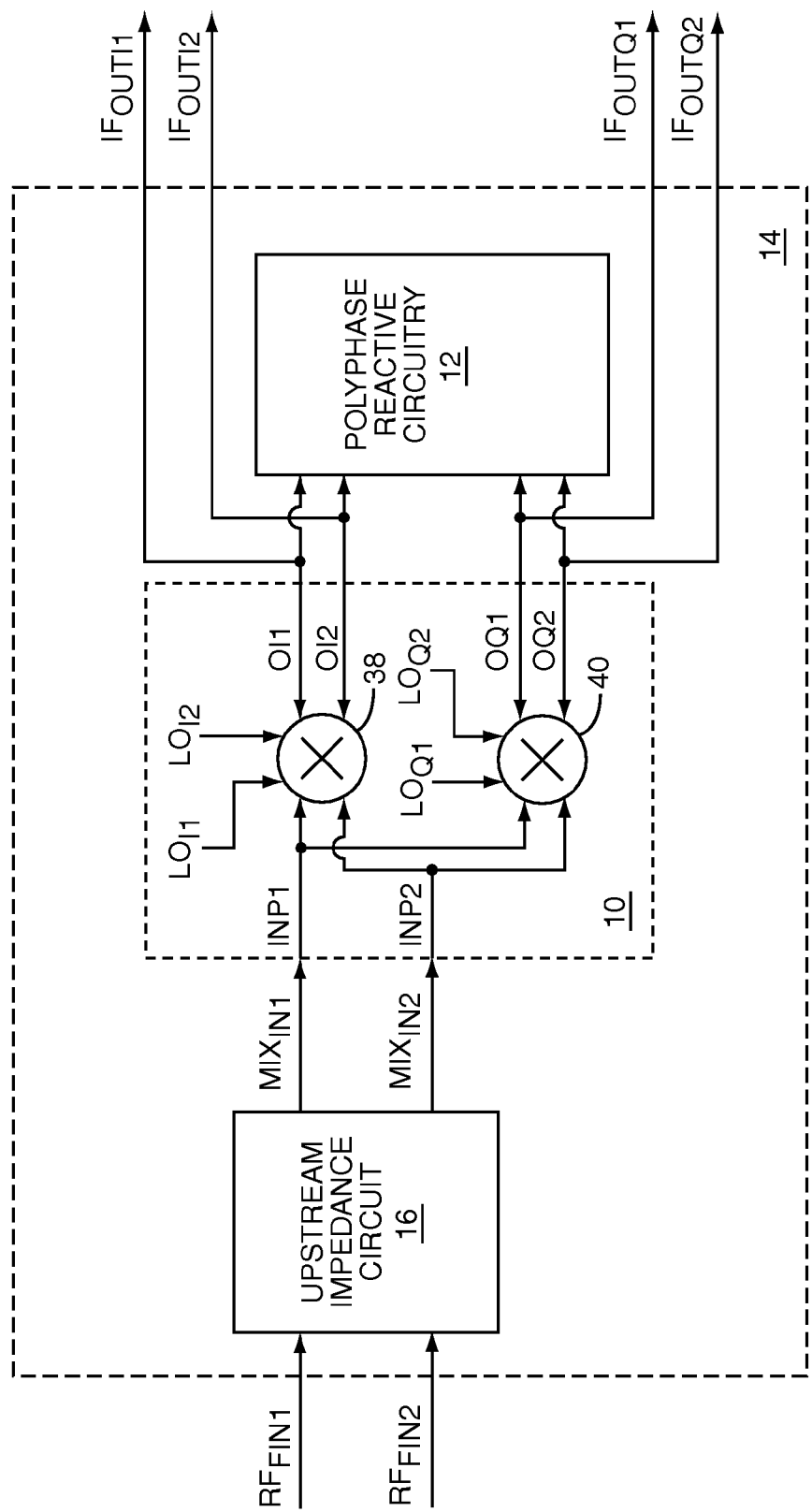

FIG. 10 shows a first quadrature embodiment of the RF bandpass filter illustrated in FIG. 3.

Figure 11:
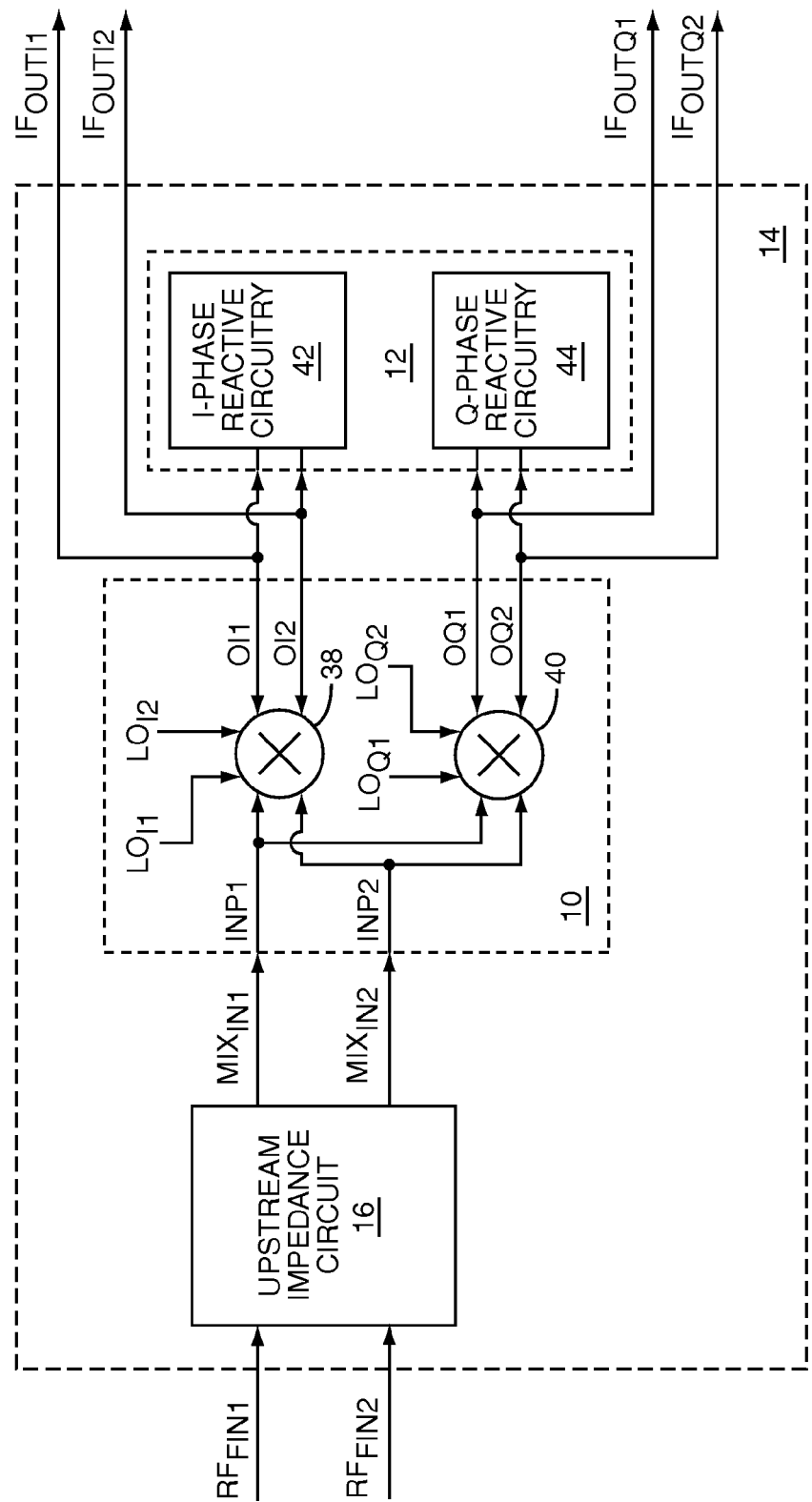

FIG. 11 adds in-phase reactive circuitry and quadrature-phase reactive circuitry to the polyphase reactive circuitry illustrated in FIG. 10.

Figure 12:
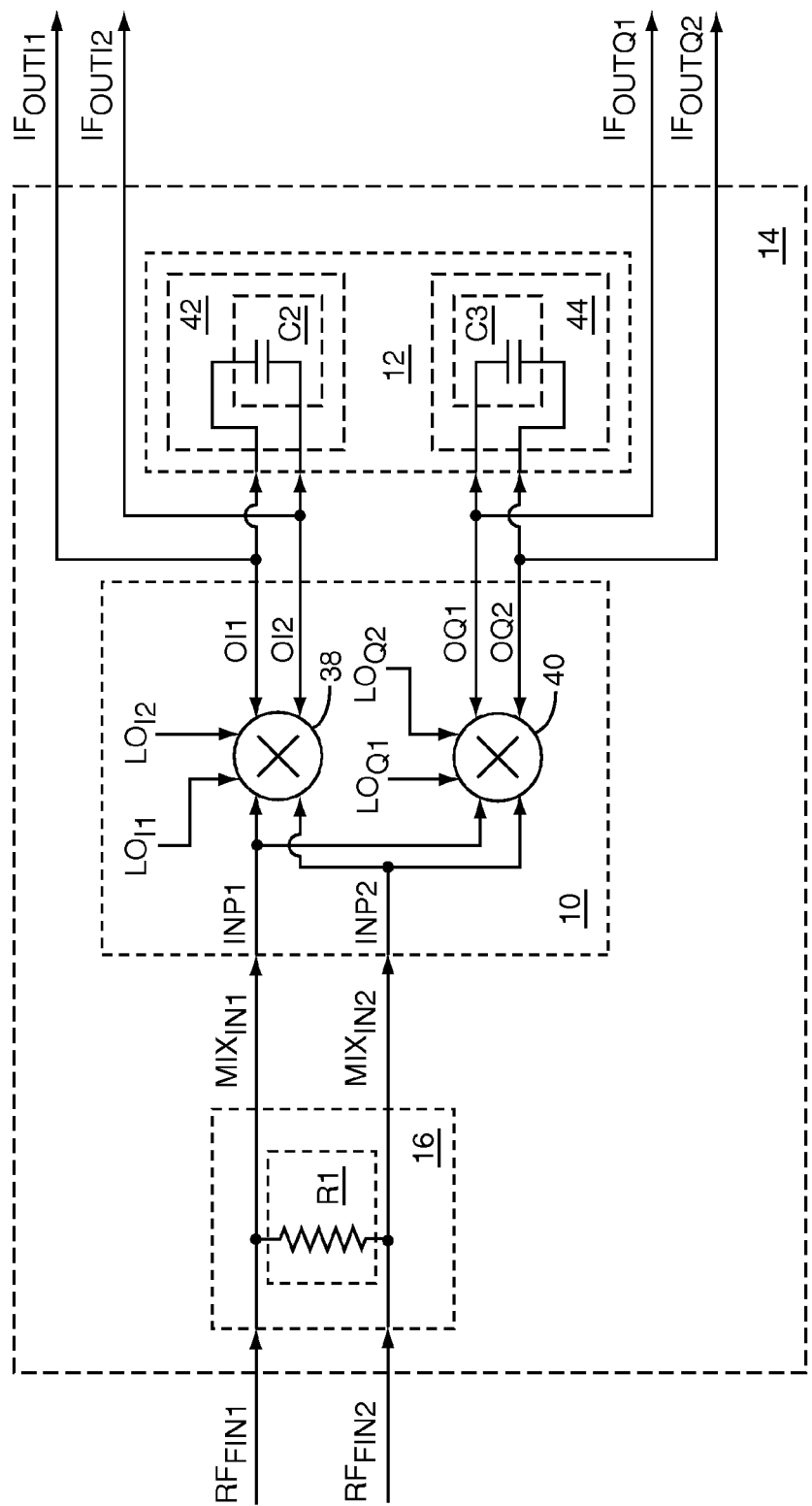

FIG. 12 shows a resistive element used in the upstream impedance circuit, and capacitive elements used in both the in-phase reactive circuitry and quadrature-phase reactive circuitry illustrated in FIG. 11.

Figure 13:
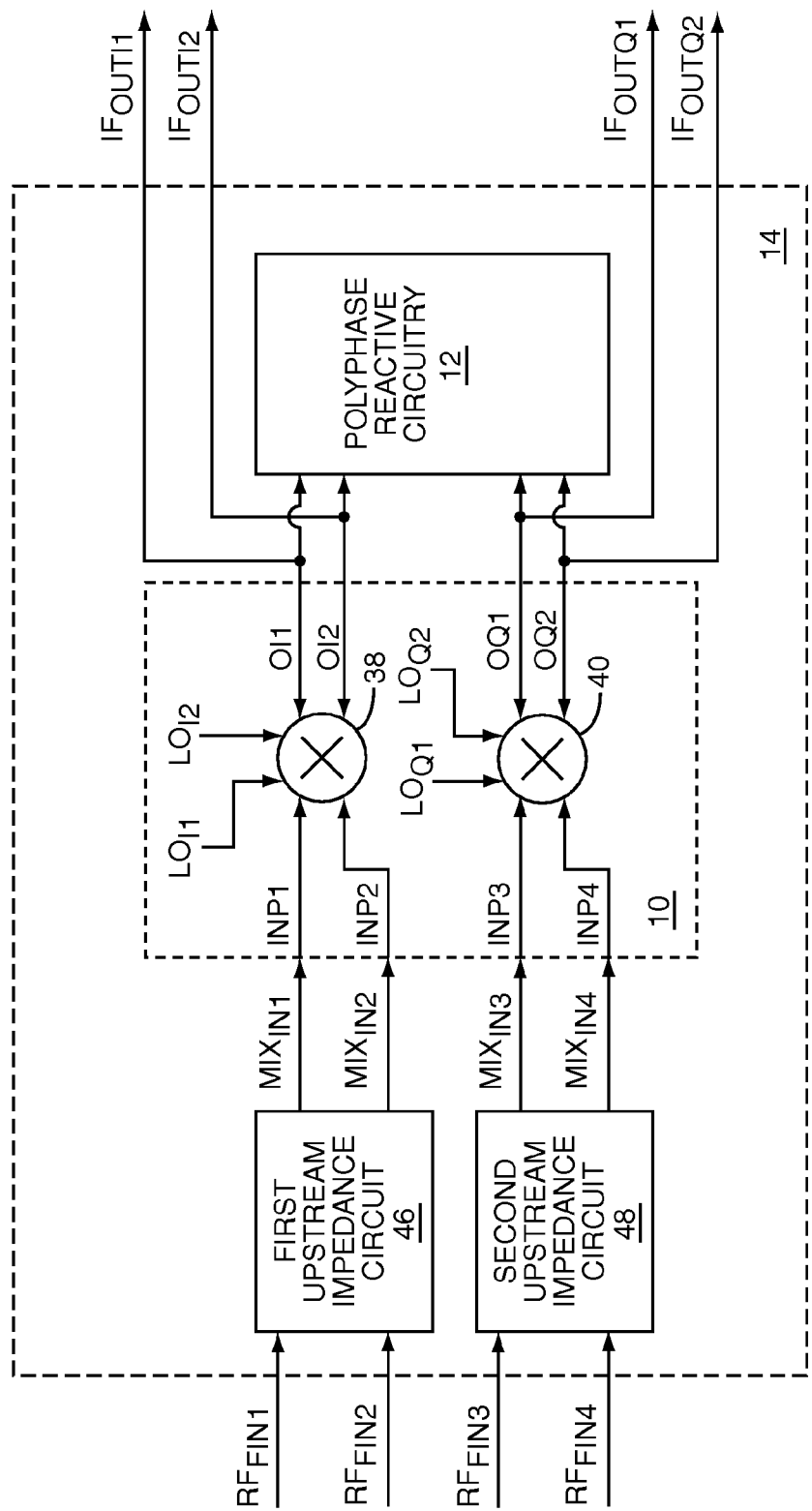

FIG. 13 shows a second quadrature embodiment of the RF bandpass filter illustrated in FIG. 3.

Figure 14:
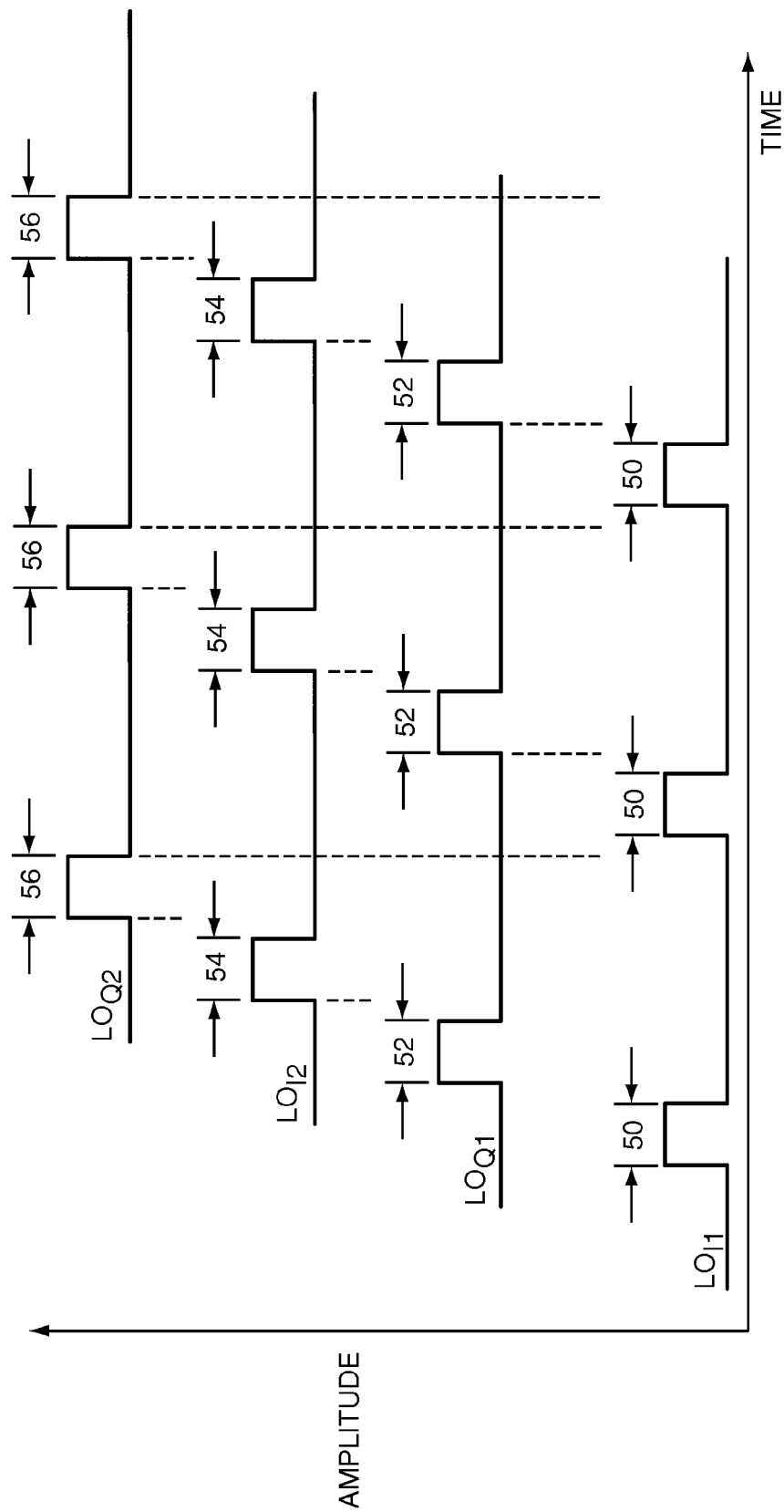

FIG. 14 is a graph showing the timing relationships of the local oscillator signals of the first quadrature embodiment of the RF bandpass filter illustrated in FIG. 10.

Figure 15:
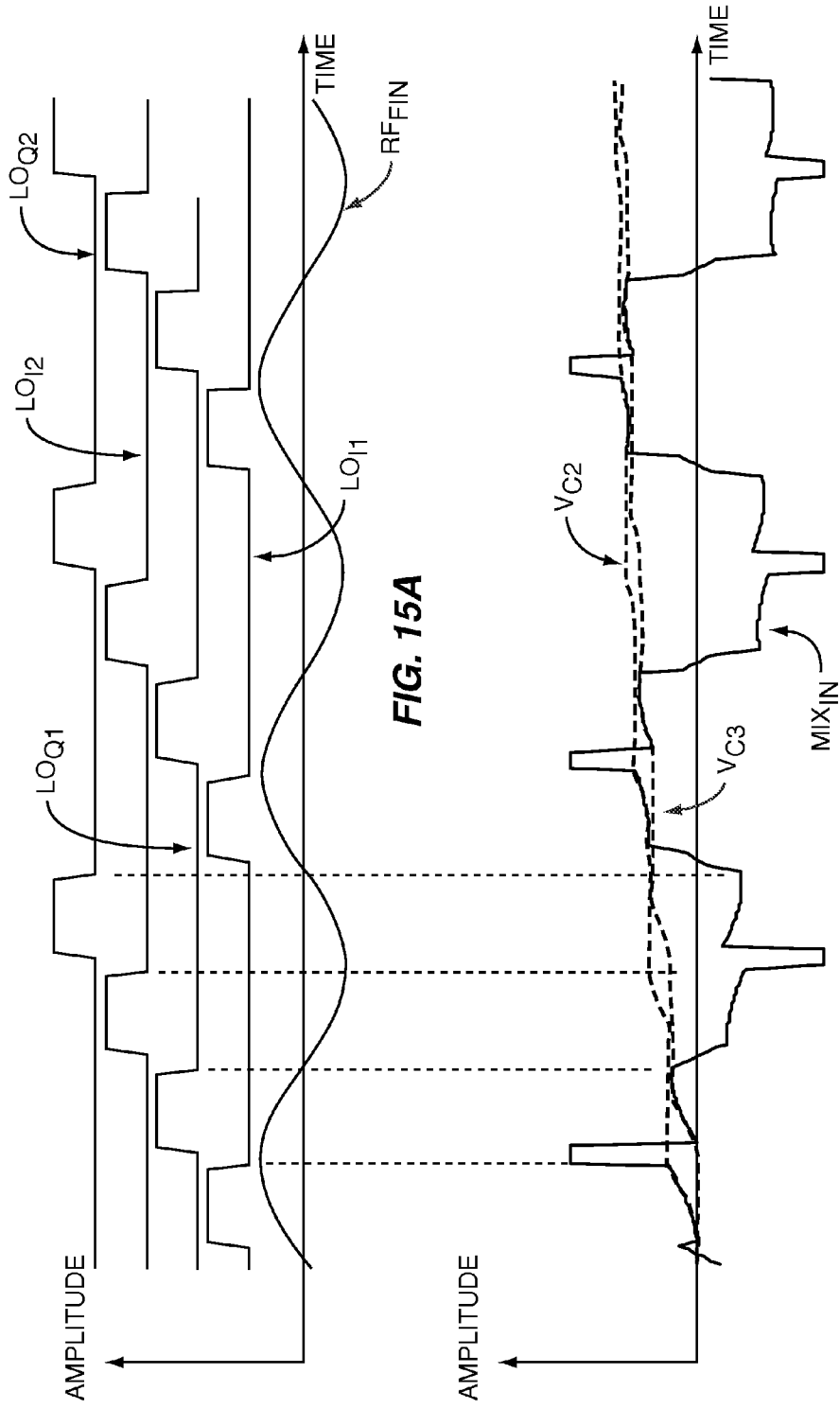

FIGS. 15A and 15B are graphs showing the timing relationships of the local oscillator signals, the mixer input voltage, and the voltages across the capacitive elements of the first quadrature embodiment of the RF bandpass filter illustrated in FIG. 12.

Figure 16:
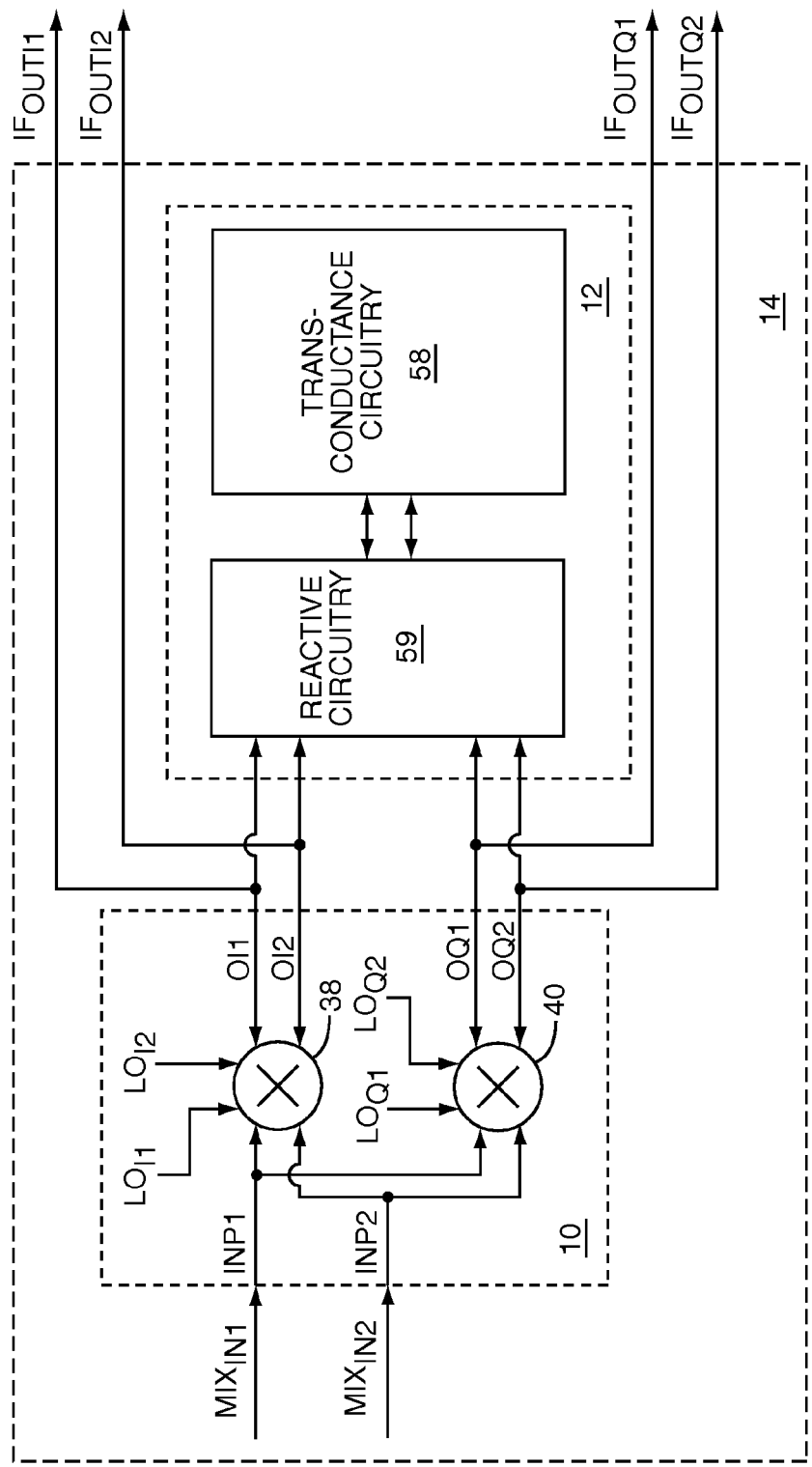

FIG. 16 adds transconductance circuitry to the first quadrature embodiment of the RF bandpass filter illustrated in FIG. 10.

Figure 17:
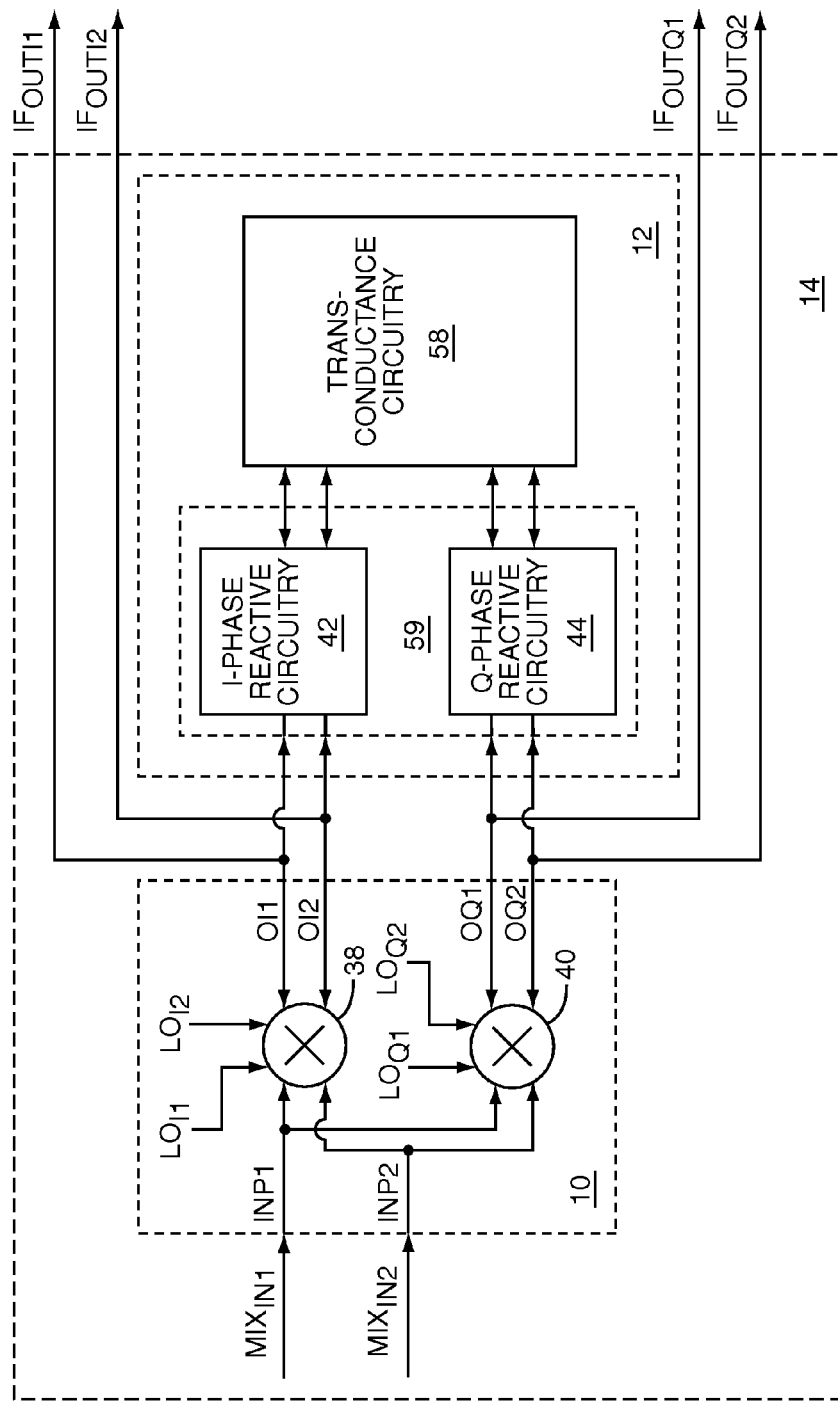

FIG. 17 adds in-phase reactive circuitry and quadrature-phase reactive circuitry to the polyphase reactive circuitry illustrated in FIG. 16.

Figure 18:
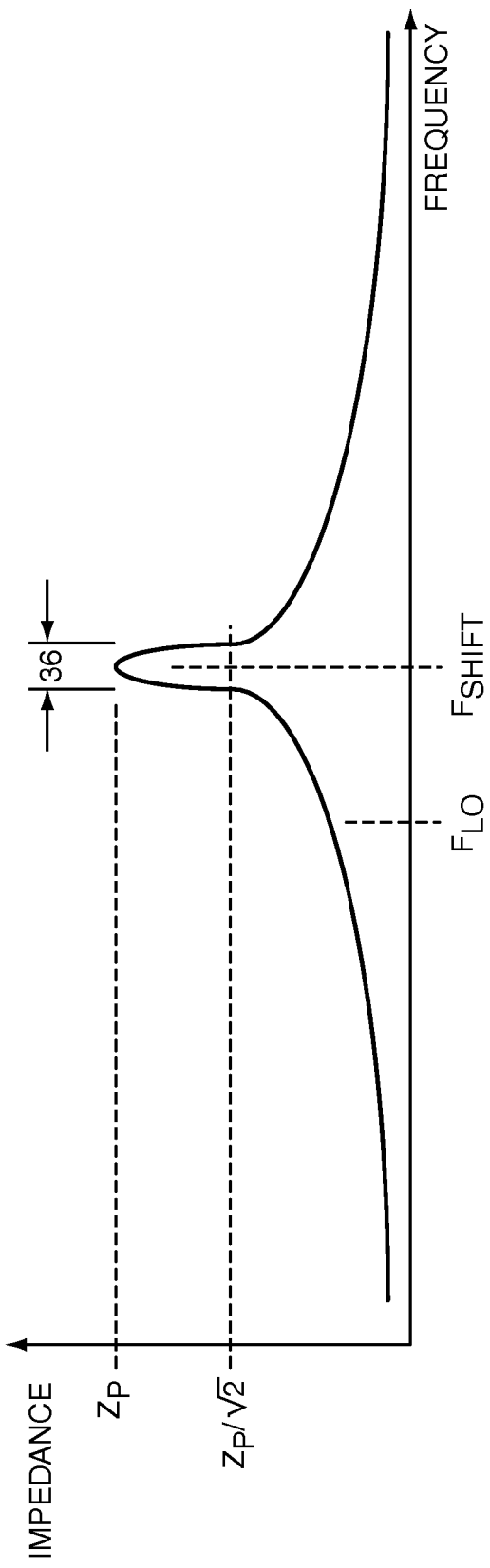

FIG. 18 is a graph showing a frequency shift of the impedance behavior produced by the transconductance circuitry illustrated in FIG. 16.

Figure 19:
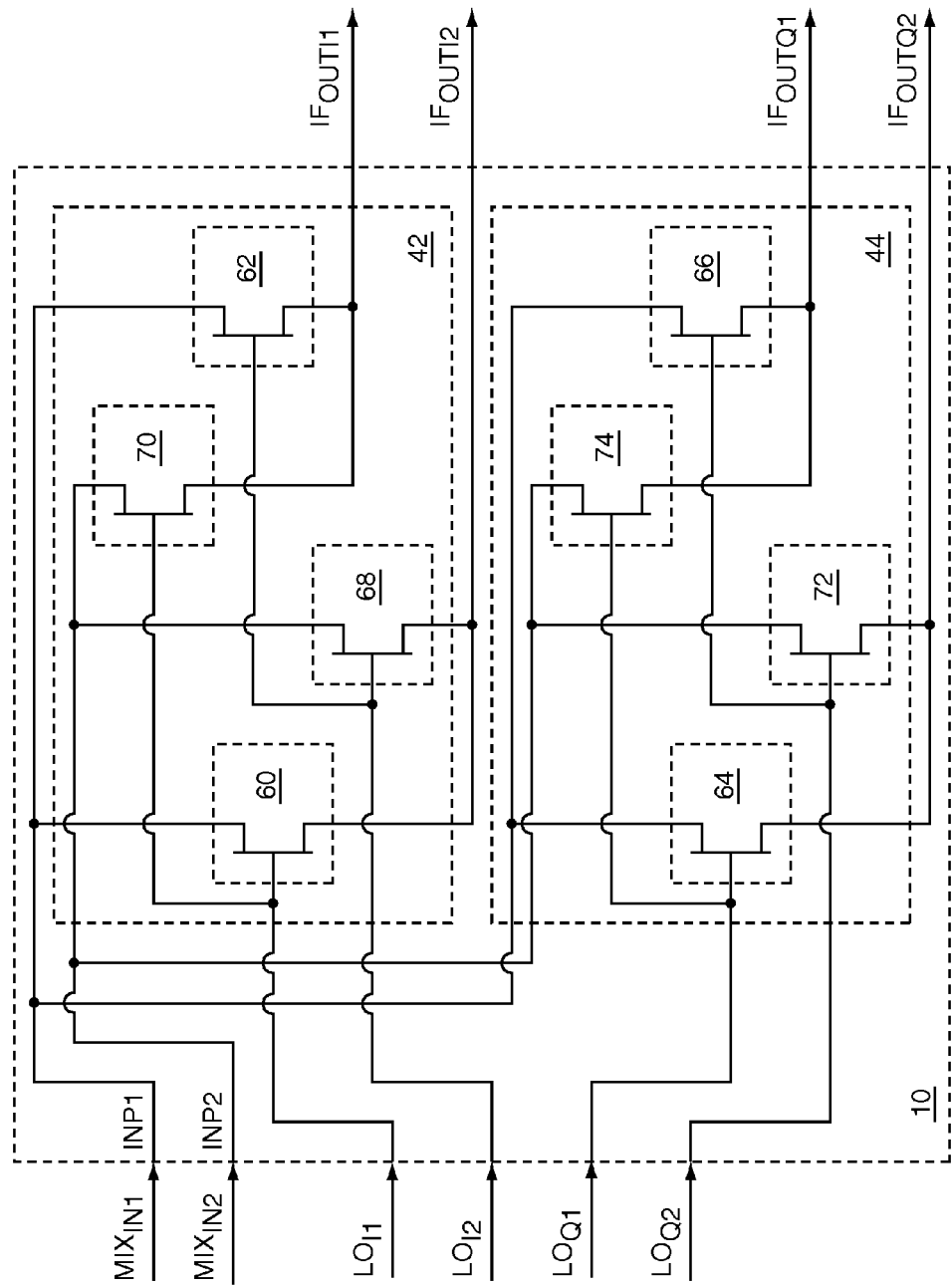

FIG. 19 shows details of the RF mixer used in the first quadrature embodiment illustrated in FIG. 10.

Figure 20:
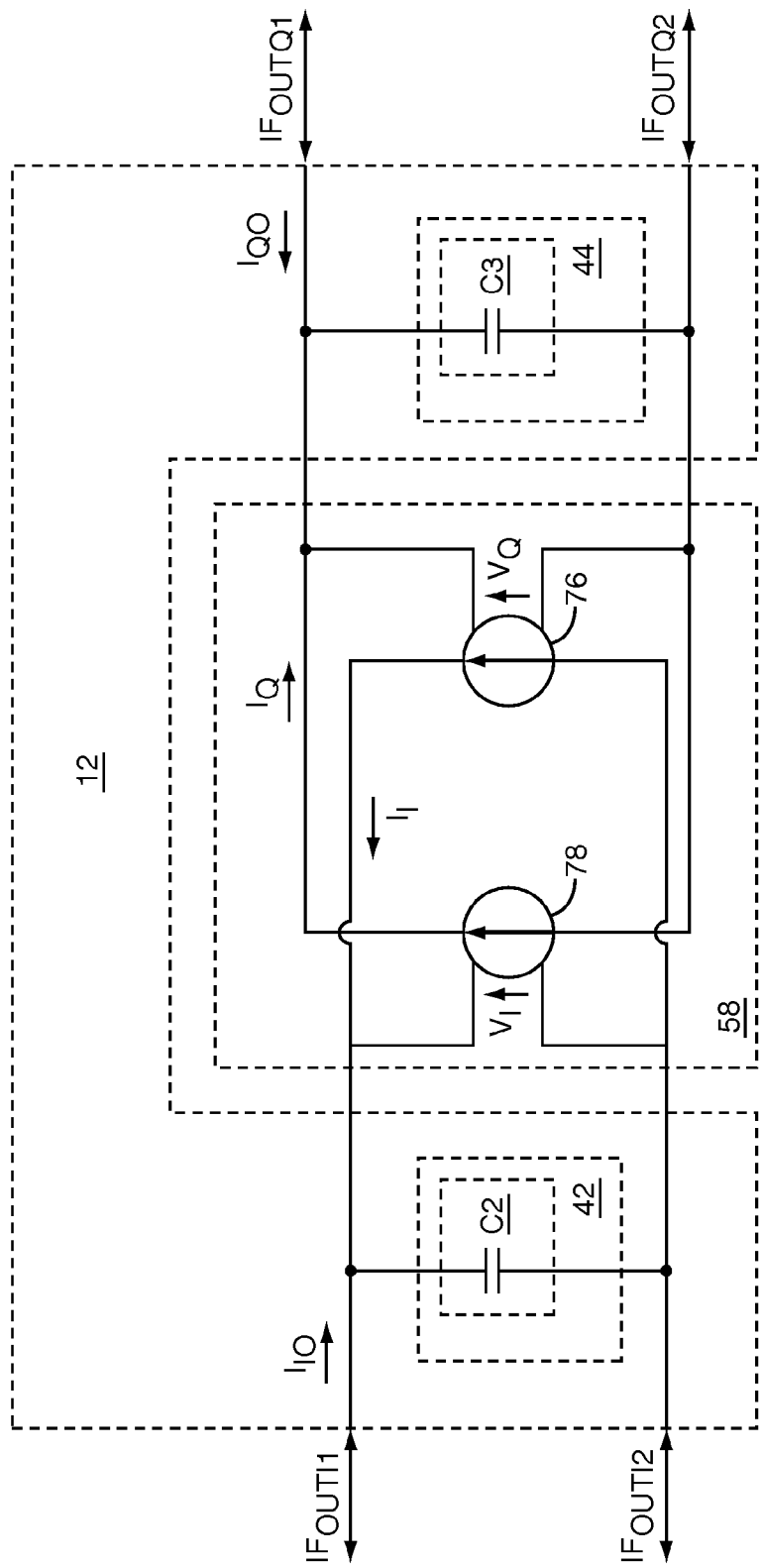

FIG. 20 shows details of the transconductance circuitry and the reactive circuitry illustrated in FIG. 17.

Figure 21:
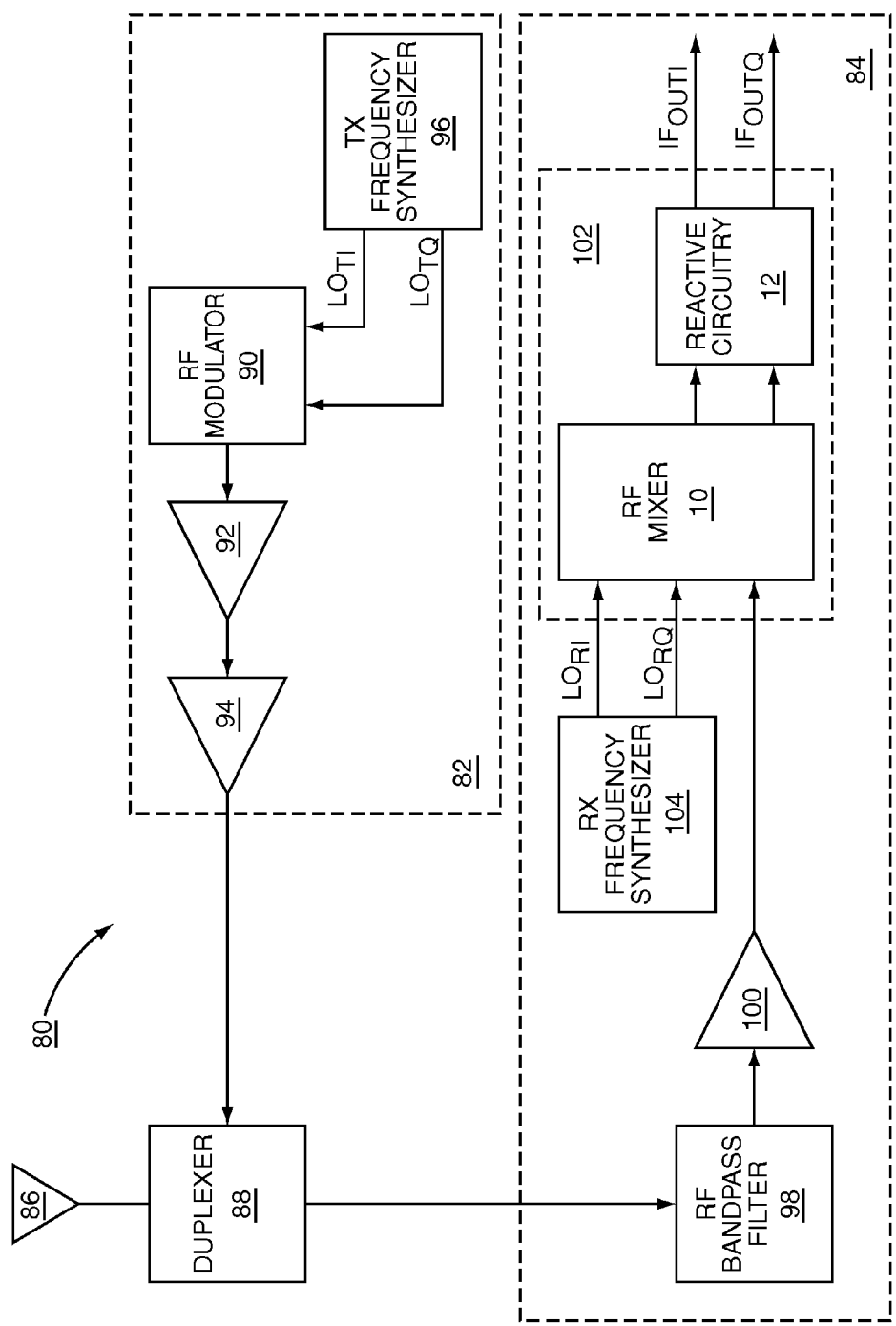

FIG. 21 shows an application example of the present invention used in an RF transceiver.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The present invention relates to a controllable input impedance RF mixer, which when fed from a high impedance source, such as a current source, provides a high quality factor (Q) impedance response associated with an impedance peak. The high-Q impedance response may be used as a high-Q RF bandpass filter in a receive path upstream of down conversion, which may improve receiver selectivity and replace surface acoustic wave (SAW) or other RF filters. The present invention uses polyphase reactive circuitry, such as capacitive elements, coupled to the down conversion outputs of an RF mixer. The RF mixer mixes RF input signals with local oscillator signals to translate the impedance of the polyphase reactive circuitry into the RF input impedance of the RF mixer. The RF input impedance includes at least one impedance peak. The local oscillator signals are non-overlapping to maximize the energy transferred to the polyphase reactive circuitry and eliminate signal losses associated with overlapping phases.

In some embodiments of the present invention, the polyphase reactive circuitry includes at least one capacitive element. The RF input impedance peak presented to RF input signals at the same phase and frequency of the local oscillator signals may theoretically approach infinity. Therefore, tuning of the impedance peak is achieved by frequency selection of the local oscillator signals. Losses from the RF mixer, the polyphase reactive circuitry, and the source impedance feeding the RF mixer determine the quality factor (Q) of the impedance of the circuit. Alternate embodiments of the present invention may enhance the polyphase reactive circuitry with transconductance circuitry to shift the impedance peak away from the local oscillator frequency to center the bandpass response around a desired receive frequency.

Some embodiments of the present invention may use a quadrature RF mixer and polyphase reactive circuitry, which may be used to create an impedance peak independent of the phase difference of the local oscillator and the RF input signals. Additionally, quadrature mixing may be used to create complex RF filtering that may include at least one bandpass filter response, at least one notch filter response, or both. Tuning of the complex filtering is achieved by frequency selection of the local oscillator signals. Transconductance circuitry may be incorporated into the polyphase reactive circuitry to create additional filter types. The RF mixer and polyphase reactive circuitry may use differential signals. The RF mixer may be a passive RF mixer, or an RF mixer that behaves in a similar manner to a passive RF mixer. The combination of passive RF mixer circuitry and polyphase reactive circuitry results in low energy loss, which may provide very low voltage mode conversion losses, and low 1/f noise and low thermal noise. In one embodiment of the present invention, the RF mixer and polyphase reactive circuitry is fed from a source impedance to create a stand alone RF filter, which may be coupled into an RF signal path. The source impedance may be provided from an output impedance of a low noise amplifier (LNA). In an alternate embodiment of the present invention, the RF mixer provides a down conversion function in an RF receiver, in addition to providing RF filter functionality. The down conversion outputs from the RF mixer are coupled to downstream circuitry to provide down converted received data. A source impedance may be provided from an output impedance of an LNA.

FIG. 1 shows an RF mixer 10 coupled to polyphase reactive circuitry 12 according to one embodiment of the present invention. The RF mixer 10 receives a mixer input signal $MIX_{IN}$ into a mixer input INP. The polyphase reactive circuitry 12 is coupled to and presents at least one impedance to at least one down conversion output from the RF mixer 10. The RF mixer 10 mixes the mixer input signal $MIX_{IN}$ with first, second, third, and fourth local oscillator signals $LO_1$, $LO_2$, $LO_3$, $LO_4$ to produce an impedance response at the mixer input INP. The impedance response may include an impedance peak when the frequency and phase of the mixer input signal $MIX_{IN}$ match the frequency and phase of the local oscillator signals $LO_1$, $LO_2$, $LO_3$, $LO_4$. Therefore, tuning the impedance peak may include an impedance quality factor greater than twenty. Certain embodiments of the present invention may include an impedance peak with an impedance quality factor greater than 50. An exemplary embodiment of the present invention may include an impedance peak with an impedance quality factor greater than 1000.

FIG. 2 shows the RF mixer 10 and polyphase reactive circuitry 12 illustrated in FIG. 1 used in an RF bandpass filter 14. An upstream impedance circuit 16 receives an RF filter input signal $RF_{FIN}$ and provides the mixer input signal $MIX_{IN}$ to the RF mixer 10. The mixer input signal $MIX_{IN}$ is used to provide an RF filter output signal $RF_{FOUT}$. The characteristics of the RF bandpass filter 14 are based on an impedance divider created by the impedance of the upstream impedance circuit 16 and the impedance response presented by the RF mixer 10. The quality factor of the RF bandpass filter 14 is determined by the impedance of the upstream impedance circuit 16 and losses in the RF mixer 10 and the polyphase reactive circuitry 12. As the impedance of the upstream impedance circuit 16 increases, the quality factor of the RF bandpass filter 14 increases.

FIG. 3 replaces the RF filter output signal $RF_{FOUT}$ illustrated in FIG. 2 with an IF output signal $IF_{OUT}$. The RF mixer 10 is used to provide the impedance response and to down convert the mixer input signal $MIX_{IN}$ into the IF output signal $IF_{OUT}$, which is used by downstream receiver circuitry to extract received data. The RF filtering behavior of the RF bandpass filter 14 is applied to the mixer input signal $MIX_{IN}$ before down conversion; therefore, the IF output signal $IF_{OUT}$ includes the effects of the RF bandpass filter 14. Since frequency selection of the local oscillator signals $LO_1$, $LO_2$, $LO_3$, $LO_4$ is chosen to receive a desired mixer input signal $MIX_{IN}$ at a specific frequency, and since the tuning of the impedance response is based on the frequency selection of the local oscillator signals $LO_1$, $LO_2$, $LO_3$, $LO_4$, the RF bandpass filter 14 is said to be self-tuning. The combination of passive RF mixer circuitry and polyphase reactive circuitry 12 results in low energy loss, which may provide a very low voltage mode conversion loss between the mixer input signal $MIX_{IN}$ and the IF output signal $IF_{OUT}$.

FIG. 4 is a graph showing the timing relationships of the local oscillator signals $LO_1$, $LO_2$, $LO_3$, $LO_4$ illustrated in FIG. 1. The first local oscillator signal $LO_1$ has a first active state 18, the second local oscillator signal $LO_2$ has a second active state 20, the third local oscillator signal $LO_3$ has a third active state 22, and the fourth local oscillator signal $LO_4$ has a fourth active state 23. To provide proper isolation between the polyphase reactive circuitry 12 and the mixer input signal $MIX_{IN}$, only one of the local oscillator signals $LO_1$, $LO_2$, $LO_3$, $LO_4$ is active at any given time; therefore, no two of the active states 18, 20, 22, 23 occur concurrently, as illustrated in FIG. 4.

FIG. 5 shows an upstream resistive element R1 used in the upstream impedance circuit 16 illustrated in FIG. 2. The upstream resistive element R1 and the impedance response presented by the RF mixer 10 provide the impedance divider that creates the characteristics of the RF bandpass filter 14.

FIG. 6 shows the upstream resistive element R1 illustrated in FIG. 5 as part of an amplifier 24. The output of the amplifier 24 may be represented as a Norton equivalent circuit, which includes an RF current source 26 coupled in parallel with an output impedance, represented by the upstream resistive element R1. The current source 26 topology is desirable, since an ideal current source presents an infinite output impedance, and as the impedance of the upstream impedance circuit 16 increases, the quality factor of the RF bandpass filter 14 increases. Therefore, if the RF mixer 10 is fed from a high impedance amplifier 24, then a high quality factor of the RF bandpass filter 14 can be realized. Integrated LNAs may be designed for high output impedance, which is useful since RF mixers are often fed from LNAs. In one embodiment of the present invention, the RF mixer 10 is fed from an LNA, and the output impedance of the LNA provides the upstream impedance circuit 16.

FIG. 7 illustrates the principal of operation of the RF mixer 10 coupled to the polyphase reactive circuitry 12, according to a detailed embodiment of the present invention. The RF current source 26 and the upstream resistive element R1 represent the output impedance of a circuit block driving the RF filter input. Together, the RF current source 26 and the upstream resistive element R1 combined capture the finite energy capability of the preceding RF circuit block or receiving antenna. Additional reactive parasitics such as a small capacitor may be present; however, these are considered to have negligible impact at the radio frequency of interest. A capacitive element C1 is used in the polyphase reactive circuitry 12. The capacitive element C1 is coupled to the down conversion outputs of the RF mixer 10. The contacts of a first switch 28 are coupled between a first leg of the capacitive element C1 and the mixer input INP. The contacts of a second switch 30 are coupled between a second leg of the capacitive element C1 and a mixer ground input INN. The contacts of a third switch 32 are coupled between the second leg of the capacitive element C1 and the mixer input INP. The contacts of a fourth switch 34 are coupled between the first leg of the capacitive element C1 and the mixer ground input INN. The first and second switches 28, 30 are controlled by the first local oscillator signal $LO_1$. The third and fourth switches 32, 34 are controlled by the second local oscillator signal $LO_2$. During the first active state 18, the first and second switches 28, 30 are closed and the third and fourth switches 32, 34 are open. During the second active state 20, the first and second switches 28, 30 are open and the third and fourth switches 32, 34 are closed.

During the first active state 18, the capacitive element C1 is coupled to the mixer input INP with one polarity. Whereas, during the second active state 20, the capacitive element C1 is coupled to the mixer input INP with a reversed polarity; therefore, if the mixer input signal $MIX_{IN}$ is equal in frequency to the local oscillator signals $LO_1$, $LO_2$, then a rectification behavior can occur, which may result in providing current to the capacitive element C1 of only one polarity. If the upstream resistive element R1 is large, then capacitor voltage $V_C$, which is proportional to the integral of the one-polarity capacitor current, will build to a very large constant value. In the steady-state, the capacitor voltage Vc will be presented between the mixer inputs INP, INN with alternating phases at the local oscillator rate. The input impedance is the fundamental frequency voltage response to the single-frequency input current at the mixer inputs INP, INN. Since the fundamental frequency voltage response is very large, the input impedance, presented at the mixer inputs INP, INN is very large. In the limiting case of an infinite upstream resistive element R1, the input impedance is infinite. If the mixer input signal $MIX_{IN}$ is slightly shifted in frequency from the local oscillator signals, the capacitor current will have more than one polarity, the integration of the capacitor current will remain finite, and the fundamental frequency voltage response at the input will be finite, resulting in a finite input impedance. An input impedance approaching infinity at one frequency but finite values at slightly shifted frequencies provides an impedance response with a very high quality factor. The present invention uses this impedance response to create RF filters with a very high quality factor, which may provide very high selectivity.

FIGS. 8A, 8B, 8C, 8D, and 8E are graphs showing the behavior of some of the signals illustrated in FIG. 7. FIG. 8D is similar to FIG. 8A and is used to provide a timing reference for FIG. 8E. The local oscillator signals $LO_1$, $LO_2$ are phase-shifted from each other by approximately 180 degrees as illustrated in FIG. 8A. The RF filter input signal $RF_{FIN}$ has the same frequency as the local oscillator signals $LO_1$, $LO_2$, and is phase-aligned such that during the first active state 18, the capacitor voltage $V_C$ increases with a positive polarity, and during the second active state 20, the capacitor voltage $V_C$ increases with the positive polarity as illustrated in FIGS. 8B and 8C. As the capacitor voltage $V_C$ increases, the impedance presented at the mixer inputs INP, INN increases, thereby causing the amplitude of the mixer input signal $MIX_{IN}$ to increase as illustrated in FIG. 8E. A fundamental frequency of the mixer input signal $MIX_{INFUND}$ has the same frequency as the RF filter input signal $RF_{FIN}$.

If the RF filter input signal $RF_{FIN}$ is phase-shifted from the local oscillator signals $LO_1$, $LO_2$ by approximately 90 degrees, then during the first active state 18, the RF filter input signal $RF_{FIN}$ is positive for approximately one-half of the first active state 18 and negative for approximately one-half of the first active state 18, which results in a capacitor voltage $V_C$ change of approximately zero. Under such conditions, the resulting input impedance approaches zero; therefore, for those situations in which the phase of the RF filter input signal $RF_{FIN}$ is not synchronized with the phases of the local oscillator signals $LO_1$, $LO_2$, an RF mixer 10 and polyphase reactive circuitry 12 may be needed to properly filter an RF filter input signal $RF_{FIN}$ of any phase. A quadrature RF mixer and quadrature polyphase reactive circuitry may provide the appropriate impedance responses needed to properly filter an RF filter input signal $RF_{FIN}$ of any phase.

FIG. 9 is a graph showing the impedance behavior of the detailed embodiment illustrated in FIG. 7. When the RF filter input signal $RF_{FIN}$ has the same frequency and is phase-aligned with the local oscillator signals $LO_1$, $LO_2$, the impedance response includes an impedance peak at the frequency of the local oscillator signals $LO_1$, $LO_2$, called the local oscillator frequency $F_{LO}$ as illustrated in FIG. 9. The impedance peak includes a maximum impedance value $Z_P$ and a square-root of one-half the maximum impedance value $Z_P/\sqrt{2}$. The impedance peak has an impedance bandwidth 36 at the square-root of one-half the maximum impedance value $Z_P/\sqrt{2}$. The impedance peak has an impedance quality factor, which is defined as the local oscillator frequency $F_{LO}$ divided by the impedance bandwidth 36. The impedance bandwidth 36 may be calculated by subtracting a second frequency from a first frequency. The first frequency is greater than the local oscillator frequency $F_{LO}$ where the impedance peak is at the square-root of one-half the maximum impedance value $Z_P/\sqrt{2}$. The second frequency is less than the local oscillator frequency $F_{LO}$ where the impedance peak is at the square-root of one-half the maximum impedance value $Z_P/\sqrt{2}$.

FIG. 10 shows a first quadrature embodiment of the RF bandpass filter 14 illustrated in FIG. 3. The upstream impedance circuit 16 receives first and second RF filter input signals $RF_{FIN1}$, $RF_{FIN2}$, and provides first and second mixer input signals $MIX_{IN1}$, $MIX_{IN2}$ to first and second mixer inputs INP1, INP2 of the RF mixer 10, which includes which an in-phase RF mixer 38 and a quadrature-phase RF mixer 40. The first and second mixer inputs INP1, INP2 are coupled to two inputs of the in-phase RF mixer 38 and two inputs of the quadrature-phase RF mixer 40. Polyphase reactive circuitry 12 is coupled to a first in-phase mixer output OI1 and a second in-phase mixer output OI2 from the in-phase RF mixer 38, and to a first quadrature-phase mixer output OQ1 and a second quadrature-phase mixer output OQ2 from the quadrature-phase RF mixer 40. The first and second mixer input signals $MIX_{IN1}$, $MIX_{IN2}$ are down-converted with in-phase and quadrature components, which are presented to the polyphase reactive circuitry 12.

To provide proper isolation between the polyphase reactive circuitry 12 and the first and second mixer input signals $MIX_{IN1}$, $MIX_{IN2}$, and to prevent interference between the in-phase and quadrature-phase inputs of the polyphase reactive circuitry 12, only one of the local oscillator signals $LO_{I1}$, $LO_{I2}$, $LO_{Q1}$, $LO_{Q2}$ is active at any given time. The first and second in-phase mixer outputs OI1, OI2 provide filtered first and second in-phase IF output signals $IF_{OUTI1}$, $IF_{OUTI2}$ for use by downstream receiver circuitry. The first and second quadrature-phase mixer outputs OQ1, OQ2 provide filtered first and second quadrature-phase IF output signals $IF_{OUTQ1}$, $IF_{OUTQ2}$ for use by downstream receiver circuitry. The polyphase reactive circuitry 12 may be fully or partially included in the input of the downstream receiver circuitry.

In one embodiment of the present invention the first and second RF filter input signals $RF_{FIN1}$, $RF_{FIN2}$ may be differential signals, the first and second mixer input signals $MIX_{IN1}$, $MIX_{IN2}$ may be differential signals, the quadrature-phase local oscillator signals $LO_{Q1}$, $LO_{Q2}$ may be phase-shifted from the in-phase local oscillator signals $LO_{I1}$, $LO_{I2}$ by approximately 90 degrees, the in-phase IF output signals $IF_{OUTI1}$, $IF_{OUTI2}$ may be differential signals, the quadrature-phase IF output signals $IF_{OUTQ1}$, $IF_{OUTQ2}$ may be differential signals, the quadrature-phase IF output signals $IF_{OUTQ1}$, $IF_{OUTQ2}$ may be phase-shifted from the in-phase IF output signals $IF_{OUTI1}$, $IF_{OUTI2}$ by approximately 90 degrees, or any combination thereof.

FIG. 11 adds in-phase (I-Phase) reactive circuitry 42 and quadrature-phase (Q-Phase) reactive circuitry 44 to the polyphase reactive circuitry 12 illustrated in FIG. 10. FIG. 12 shows the upstream resistive element R1 used in the upstream impedance circuit 16, and in-phase and quadrature-phase capacitive elements C2, C3 used in the in-phase reactive circuitry 42 and quadrature-phase reactive circuitry 44.

FIG. 13 shows a second quadrature embodiment of the RF bandpass filter 14 illustrated in FIG. 3. A first upstream impedance circuit 46 receives first and second RF filter input signals $RF_{FIN1}$, $RF_{FIN2}$, and provides first and second mixer input signals $MIX_{IN1}$, $MIX_{IN2}$ to first and second mixer inputs INP1, INP2 of the RF mixer 10. A second upstream impedance circuit 48 receives third and fourth RF filter input signals $RF_{FIN3}$, $RF_{FIN4}$, and provides third and fourth mixer input signals $MIX_{IN3}$, $MIX_{IN4}$ to third and fourth mixer inputs INP3, INP4 of the RF mixer 10. The third and fourth mixer inputs INP3, INP4 are coupled to a quadrature-phase RF mixer 40. The polyphase reactive circuitry 12 is coupled to and presents an in-phase impedance to an in-phase down conversion output from the in-phase RF mixer 38, and the polyphase reactive circuitry 12 is coupled to and presents a quadrature-phase impedance to a quadrature-phase down conversion output from the quadrature-phase RF mixer 40. The in-phase RF mixer 38 mixes the first and second mixer input signals $MIX_{IN1}$, $MIX_{IN2}$ with first and second in-phase local oscillator signals $LO_{I1}$, $LO_{I2}$ to produce an in-phase impedance response at the first and second mixer inputs INP1, INP2. The in-phase impedance response may include an in-phase impedance peak when the frequency and phase of the first and second mixer input signals $MIX_{IN1}$, $MIX_{IN2}$ match the frequency and phase of the in-phase local oscillator signals $LO_{I1}$, $LO_{I2}$. The quadrature-phase RF mixer 40 mixes the third and fourth mixer input signals $MIX_{IN3}$, $MIX_{IN4}$ with first and second quadrature-phase local oscillator signals $LO_{Q1}$, $LO_{Q2}$ to produce a quadrature-phase impedance response at the third and fourth mixer inputs INP3, INP4. The quadrature-phase impedance response may include a quadrature-phase impedance peak when the frequency and phase of the third and fourth mixer input signals $MIX_{IN3}$, $MIX_{IN4}$ match the frequency and phase of the quadrature-phase local oscillator signals $LO_{Q1}$, $LO_{Q2}$.

Typically, the first and second RF filter input signals $RF_{FIN1}$, $RF_{FIN2}$ are provided from a first amplifier (not shown), and the third and fourth RF filter input signals $RF_{FIN3}$, $RF_{FIN4}$ are provided from a second amplifier (not shown). The first and second amplifiers are equivalent and both receive and amplify a common RF input signal. Typically, the first upstream impedance circuit 46 is equivalent to the second upstream impedance circuit 48. To provide proper isolation between the polyphase reactive circuitry 12 and the first and second mixer input signals $MIX_{IN1}$, $MIX_{IN2}$, only one of the in-phase local oscillator signals $LO_{I1}$, $LO_{I2}$ is active at any given time. To provide proper isolation between the polyphase reactive circuitry 12 and the third and fourth mixer input signals $MIX_{IN3}$, $MIX_{IN4}$, only one of the quadrature-phase local oscillator signals $LO_{Q1}$, $LO_{Q2}$ is active at any given time. The in-phase down conversion output provides filtered first and second in-phase IF output signals $IF_{OUTI1}$, $IF_{OUTI2}$ for use by downstream receiver circuitry. The quadrature-phase down conversion output provides filtered first and second quadrature-phase IF output signals $IF_{OUTQ1}$, $IF_{OUTQ2}$ for use by downstream receiver circuitry.

In one embodiment of the present invention, the first and second RF filter input signals $RF_{FIN1}$, $RF_{FIN2}$ may be differential signals, the third and fourth RF filter input signals $RF_{FIN3}$, $RF_{FIN4}$ may be differential signals, the first and second mixer input signals $MIX_{IN1}$, $MIX_{IN2}$ may be differential signals, the third and fourth mixer input signals $MIX_{IN3}$, $MIX_{IN4}$ may be differential signals, the quadrature-phase local oscillator signals $LO_{Q1}$, $LO_{Q2}$ may be phase-shifted from the in-phase local oscillator signals $LO_{I1}$, $LO_{I2}$ by approximately 90 degrees, the in-phase IF output signals $IF_{OUTI1}$, $IF_{OUTI2}$ may be differential signals, the quadrature-phase IF output signals $IF_{OUTQ1}$, $IF_{OUTQ2}$ may be differential signals.

FIG. 14 is a graph showing the timing relationships of the local oscillator signals $LO_{I1}$, $LO_{I2}$, $LO_{Q1}$, $LO_{Q2}$ of the first quadrature embodiment of the RF bandpass filter 14 illustrated in FIG. 10. The first in-phase local oscillator signal $LO_{I1}$ has a first in-phase active state 50. The first quadrature-phase local oscillator signal $LO_{Q1}$ has a first quadrature-phase active state 52. The second in-phase local oscillator signal $LO_{I2}$ has a second in-phase active state 54. The second quadrature-phase local oscillator signal $LO_{Q2}$ has a second quadrature-phase active state 56. To provide proper isolation between the polyphase reactive circuitry 12 and the first and second mixer input signals $MIX_{IN1}$, $MIX_{IN2}$, only one of the local oscillator signals $LO_{I1}$, $LO_{I2}$, $LO_{Q1}$, $LO_{Q2}$ is active at any given time; therefore, no two of the active states 50, 54, 52, 56 occur concurrently, as illustrated in FIG. 14. The quadrature-phase local oscillator signals $LO_{Q1}$, $LO_{Q2}$ are phase-shifted from the in-phase local oscillator signals $LO_{I1}$, $LO_{I2}$ by approximately 90 degrees, respectively. The first in-phase local oscillator signal $LO_{I1}$ is phase-shifted from the second in-phase local oscillator signal $LO_{I2}$ by approximately 180 degrees. The first quadrature-phase local oscillator signal $LO_{Q1}$ is phase-shifted from the second quadrature-phase local oscillator signal $LO_{Q2}$ by approximately 180 degrees.

FIGS. 15A and 15B are graphs showing the timing relationships of the local oscillator signals $LO_{I1}$, $LO_{I2}$, $LO_{Q1}$, $LO_{Q2}$, the RF filter input signal $RF_{FIN}$, which is the current supplied by the first and second RF filter input signals $RF_{FIN1}$, $RF_{FIN2}$, the mixer input signal $MIX_{IN}$, which is the voltage across the first and second mixer inputs INP1, INP2, the voltage across the in-phase capacitive element $V_{C2}$, and the voltage across the quadrature-phase capacitive element $V_{C3}$, of the first quadrature embodiment of the RF bandpass filter 14 illustrated in FIG. 12. Since a quadrature arrangement is used, an RF filter input signal $RF_{FIN}$ of any phase with respect to the local oscillator signals $LO_{I1}$, $LO_{I2}$, $LO_{Q1}$, $LO_{Q2}$ may be effectively filtered. For example, in FIG. 15A the peaks of the RF filter input signal $RF_{FIN}$ are approximately phase-aligned with the first and second in-phase active states 50, 54, and the peaks of the RF filter input signal $RF_{FIN}$ are phase-shifted from the first and second quadrature-phase active states 52, 56 by approximately 90 degrees.

During the first in-phase active state 50, the in-phase capacitive element C2 is coupled across the first and second mixer inputs INP1, INP2. Therefore, the voltage across the upstream resistive element R1, which is equal to the mixer input signal $MIX_{IN}$, is equal to the voltage across the in-phase capacitive element $V_{C2}$, and the RF filter input signal $RF_{FIN}$, which is a current, is divided between the upstream resistive element R1 and the in-phase capacitive element C2. Since RF filter input signal $RF_{FIN}$ is positive during the first in-phase active state 50, its current is integrated by the in-phase capacitive element C2, which produces a positive voltage across the in-phase capacitive element $V_{C2}$, as illustrated in FIG. 15B. During the second in-phase active state 54, the in-phase capacitive element C2 is coupled across the first and second mixer inputs INP1, INP2 with an opposite polarity. Since the RF filter input signal $RF_{FIN}$ is negative during the second in-phase active state 54, its current is integrated by the in-phase capacitive element C2 to add to the voltage across the in-phase capacitive element $V_{C2}$, which continues to build, as illustrated in FIG. 15B. In subsequent cycles of the RF filter input signal $RF_{FIN}$, the voltage across the in-phase capacitive element $V_{C2}$ will continue to build until limited by preferential current flow into the upstream resistive element R1.

During the first quadrature-phase active state 52, the quadrature-phase capacitive element C3 is coupled across the first and second mixer inputs INP1, INP2. Therefore, the voltage across the upstream resistive element R1, which is equal to the mixer input signal $MIX_{IN}$, is equal to the voltage across the quadrature-phase capacitive element $V_{C3}$, and the RF filter input signal $RF_{FIN}$, which is a current, is divided between the upstream resistive element R1 and the quadrature-phase capacitive element C3. Since the RF filter input signal $RF_{FIN}$ is positive during the first quadrature-phase active state 52, its current is integrated by the quadrature-phase capacitive element C3, which produces a positive voltage across the quadrature-phase capacitive element $V_{C3}$, as illustrated in FIG. 15B.

During the second quadrature-phase active state 56, the quadrature-phase capacitive element C3 is coupled across the first and second mixer inputs INP1, INP2 with an opposite polarity. Since the RF filter input signal $RF_{FIN}$ is negative, its current is integrated to add to the voltage across the quadrature-phase capacitive element $V_{C3}$, as illustrated in FIG. 15B. In subsequent cycles of the RF filter input signal $RF_{FIN}$, the voltage across the quadrature-phase capacitive element $V_{C3}$ will continue to build until limited by preferential current flow into the upstream resistive element R1. The voltages on the in-phase and quadrature-phase capacitive elements C2, C3 are presented back to the first and second mixer inputs INP1, INP2 in phase with the RF filter input signal $RF_{FIN}$ as shown in FIG. 15B. The large fundamental component of the mixer input signal $MIX_{IN}$ in response to the RF filter input signal $RF_{FIN}$, which is a sinusoidal current of the same frequency and phase, is equivalent to a large impedance. For frequencies of the RF filter input signal $RF_{FIN}$ somewhat above or below the frequency of the local oscillator signals $LO_{I1}$, $LO_{I2}$, $LO_{Q1}$, $LO_{Q2}$, the integration of the current onto the capacitors will not always be reinforcing, resulting in lower voltages across the in-phase and quadrature-phase capacitive elements $V_{C2}$, $V_{C3}$, which results in a lower mixer input signal $MIX_{IN}$. A frequency component of the mixer input signal $MIX_{IN}$ at the same frequency as the RF filter input signal $RF_{FIN}$ will be at a lower magnitude, resulting in a lower impedance at an offset frequency. If the frequency of the RF filter input signal $RF_{FIN}$ is the same as the frequency of the local oscillator signals $LO_{I1}$, $LO_{I2}$, $LO_{Q1}$, $LO_{Q2}$, but the phase is offset, the voltages across the in-phase and quadrature-phase capacitive elements $V_{C2}$, $V_{C3}$ will be the in-phase and quadrature-phase down converted components of the RF filter input signal $RF_{FIN}$. The vector magnitude $\sqrt{V_{c2}^2 + V_{c3}^2}$ will be constant. The equivalent impedance is independent of the phase offset. The equivalent input impedance looking from the Norton source formed by the RF current source 26 and the upstream resistive element R1 has the form shown in FIG. 9 at frequencies around the frequency of the local oscillator signals $LO_{I1}$, $LO_{I2}$, $LO_{Q1}$, $LO_{Q2}$, but below the third harmonic of the frequency of the local oscillator signals $LO_{I1}$, $LO_{I2}$, $LO_{Q1}$, $LO_{Q2}$. The equivalent impedance exhibits a high-Q resonant behavior at the frequency of the local oscillator signals $LO_{I1}$, $LO_{I2}$, $LO_{Q1}$, $LO_{Q2}$, and is tunable with the frequency of the local oscillator signals $LO_{I1}$, $LO_{I2}$, $LO_{Q1}$, $LO_{Q2}$.

FIG. 16 shows details of the polyphase reactive circuitry 12 illustrated in FIG. 10. Transconductance circuitry 58 is combined with reactive circuitry 59 to provide the polyphase reactive circuitry 12, which may be used to shift the frequency impedance peak away from the local oscillator frequency $F_{LO}$. Such a frequency shift is useful when the frequency of a desired receiver signal is offset from the local oscillator frequency $F_{LO}$ or for fine frequency adjustment. The frequency shift may be approximately equal to an IF center frequency. The RF bandpass filter 14 may have a high quality factor, which may effectively filter out IF images, even with fairly low IF center frequencies. In one embodiment of the present invention, all or part of the RF mixer 10, the polyphase reactive circuitry 12, and the transconductance circuitry 58 may be provided by complementary metal-oxide-semiconductor (CMOS) circuitry. One or more integrated circuit (IC) may provide all or part of the RF mixer 10, the polyphase reactive circuitry 12, and the transconductance circuitry 58.

FIG. 17 adds in-phase reactive circuitry 42 and quadrature-phase reactive circuitry 44 to the reactive circuitry 59 illustrated in FIG. 16. FIG. 18 is a graph showing a frequency shift of the impedance behavior produced by the transconductance circuitry 58 illustrated in FIG. 16. The graph is similar to the graph illustrated in FIG. 9, except the impedance peak is centered at a shifted frequency $F_{SHIFT}$ instead of the local oscillator frequency $F_{LO}$. In one embodiment of the present invention, the frequency shift may be used to reject signals at an image frequency that is associated with the RF mixer 10. The image frequency may be associated with a low-IF or a high-IF receiver.

FIG. 19 shows details of the RF mixer 10 used in the first quadrature embodiment illustrated in FIG. 10. The RF mixer 10 is a differential switching RF passive mixer using field effect transistors (FETs) as switching elements. The first mixer input INP1 is coupled to the drains of a first in-phase transistor 60, a second in-phase transistor 62, a first quadrature-phase transistor 64, and a second quadrature-phase transistor 66. The second mixer input INP2 is coupled to the drains of a third in-phase transistor 68, a fourth in-phase transistor 70, a third quadrature-phase transistor 72, and a fourth quadrature-phase transistor 74. The first in-phase local oscillator signal $LO_{I1}$ is received by a first in-phase local oscillator input, which is coupled to the gates of the first in-phase transistor 60 and the fourth in-phase transistor 70. The second in-phase local oscillator signal $LO_{I2}$ is received by a second in-phase local oscillator input, which is coupled to the gates of the third in-phase transistor 68 and the second in-phase transistor 62.

The first quadrature-phase local oscillator signal $LO_{Q1}$ is received by a first quadrature-phase local oscillator input, which is coupled to the gates of the first quadrature-phase transistor 64 and the fourth quadrature-phase transistor 74. The second quadrature-phase local oscillator signal $LO_{Q2}$ is received by a second quadrature-phase local oscillator input, which is coupled to the gates of the third quadrature-phase transistor 72 and the second quadrature-phase transistor 66. The first in-phase IF output signal $IF_{OUTI1}$ is provided from a first in-phase IF output, which is coupled to the sources of the fourth in-phase transistor 70 and the second in-phase transistor 62. The second in-phase IF output signal $IF_{OUTI2}$ is provided from a second in-phase IF output, which is coupled to the sources of the first in-phase transistor 60 and the third in-phase transistor 68. The first quadrature-phase IF output signal $IF_{OUTQ1}$ is provided from a first quadrature-phase IF output, which is coupled to the sources of the fourth quadrature-phase transistor 74 and the second quadrature-phase transistor 66. The second quadrature-phase IF output signal $IF_{OUTQ2}$ is provided from a second quadrature-phase IF output, which is coupled to the sources of the first quadrature-phase transistor 64 and the third quadrature-phase transistor 72.

FIG. 20 shows details of the transconductance circuitry 58 and the polyphase reactive circuitry 12 illustrated in FIG. 17. The polyphase reactive circuitry 12 includes the in-phase and quadrature-phase capacitive elements C2, C3 used in the in-phase reactive circuitry 42 and the quadrature-phase reactive circuitry 44 as illustrated in FIG. 12. The in-phase capacitive element C2 is coupled between the first and second in-phase IF outputs (not shown), which are differential outputs. The first in-phase IF output provides an in-phase output current $I_{IO}$. The quadrature-phase capacitive element C3 is coupled between the first and second quadrature-phase IF outputs (not shown), which are differential outputs. The first quadrature-phase IF output provides a quadrature-phase output current $I_{QO}$. An in-phase current source 76 is coupled in parallel with the in-phase capacitive element C2. The in-phase current source 76 provides an in-phase current $I_I$, and is controlled by a quadrature-phase voltage $V_Q$, which is the voltage across the quadrature-phase capacitive element C3. A quadrature-phase current source 78 is coupled in parallel with the quadrature-phase capacitive element C3. The quadrature-phase current source 78 provides a quadrature-phase current $I_Q$, and is controlled by an in-phase voltage $V_I$, which is the voltage across the in-phase capacitive element C2.

The impedance presented to the in-phase IF outputs is the in-phase impedance $Z_I$. The impedance presented to the quadrature-phase IF outputs is the quadrature-phase impedance $Z_Q$. The ratio of the in-phase current $I_I$ to the quadrature-phase voltage $V_Q$ is the transconductance of the in-phase current source 76, which is called the in-phase transconductance $GM_I$. The ratio of the quadrature-phase current $I_Q$ to the in-phase voltage $V_I$ is the transconductance of the quadrature-phase current source 78, which is called the quadrature-phase transconductance $GM_Q$. s is equal to $j2\pi f$. If the transconductances $GM_I$, $GM_Q$ are zero, then the transconductance circuitry 58 has no effect and the impedances $Z_I$, $Z_Q$ are given by the impedances of the capacitive elements C2, C3, which are typically equal:

$$Z_I = V_I/I_{IO} = 1/(sC2).$$  EQ. 1:

$$Z_Q = V_Q/I_{QO} = 1/(sC3).$$  EQ. 2:

If the transconductances $GM_I$, $GM_Q$ are non-zero, then the impedances of the capacitive elements C2, C3 are given by:

$$1/(sC2) = V_I/(I_{IO} - I_I).$$  EQ. 3:

$$1/(sC3) = V_Q/(I_{QO} - I_Q).$$  EQ. 4:

Re-arranging:

$$V_I = (I_{IO} - I_I)/(sC2).$$  EQ. 5:

$$V_Q = (I_{QO} - I_Q)/(sC3).$$  EQ. 6:

Substituting for $I_I$ and $I_Q$:

$$V_I = (I_{IO} - V_Q(GM_I))/(sC2).$$  EQ. 7:

$$V_Q = (I_{QO} - V_I(GM_Q))/(sC3).$$  EQ. 8:

If C2=C3=C, $GM_I = -GM_Q = GM$, and $I_{QO} = jI_{IO}$, then:

$$V_I = (I_{IO} - V_Q(GM))/sC.$$  EQ. 9:

$$V_Q = (jI_{IO} + V_I(GM))/sC.$$  EQ. 10:

Substituting EQ. 10 into EQ. 9:

$$V_I = (I_{IO}/sC) - (jI_{IO}(GM))/s^2C^2) - (V_I(GM^2)/s^2C^2).$$  EQ. 11:

Re-arranging:

$$V_I(1 + GM^2/s^2C^2) = (I_{IO}/sC)(1 - jGM/sC).$$  EQ. 12:

$$V_I/I_{IO} = (1/sC)(1 - jGM/sC)/(1 + GM^2/s^2C^2).$$  EQ. 13:

Factoring:

$$V_I/I_{IO} = (1/sC)(1 - jGM/sC)/(1 - jGM/sC)(1 + jGM/sC).$$  EQ. 14:

Simplifying:

$$V_I/I_{IO} = 1/sC(1 + jGM/sC).$$  EQ. 15:

Re-arranging:

$$Z_I = V_I/I_{IO} = 1/((s + jGM/C)(C)).$$  EQ. 16:

From EQ. 1, the frequency of the impedance peak looking into the outputs of the RF bandpass filter 14 that provide the filtered first and second in-phase IF output signals $IF_{OUTI1}$, $IF_{OUTI2}$ and filtered first and second quadrature-phase IF output signals $IF_{OUTQ1}$, $IF_{OUTQ2}$ when the transconductance circuitry 58 is disabled is zero or direct current (DC). This zero frequency is translated by the RF mixer 10 to the local oscillator frequency $F_{LO}$ so the impedance peak at the mixer input INP occurs at:

$$S_1 = j2\pi F_{LO}.$$  EQ. 17:

From EQ. 16, when the transconductance circuitry 58 is enabled, the in-phase impedance $Z_I$ has a peak at $s = -j\,GM/C$; therefore, the maximum impedance at the mixer input INP occurs at:

$$F_{PEAK} = F_{LO} - GM/2\pi C.$$  EQ. 18:

Therefore, the transconductance circuitry 58 shifts the frequency of the impedance by $-GM/2\pi C$.

FIG. 21 shows the present invention used in a full duplex transceiver circuit 80, which includes an RF transmitter 82 and an RF receiver 84. The RF transmitter and receiver 82, 84 are coupled to an RF antenna 86 through an RF duplexer 88. The RF transmitter 82 includes an RF modulator 90, which feeds an RF driver stage 92. The RF driver stage 92 feeds an RF final stage 94, which feeds the RF duplexer 88. A transmitter frequency synthesizer 96 provides a transmitter in-phase local oscillator signal $LO_{TI}$ and a transmitter quadrature-phase local oscillator signal $LO_{TQ}$ to the RF modulator 90.

The RF receiver 84 includes a first receiver RF bandpass filter 98, which receives RF signals from the RF duplexer 88. The first receiver RF bandpass filter 98 feeds a low noise amplifier (LNA) 100, which feeds an integrated RF bandpass filter and down converter 102 in one embodiment of the present invention. A receiver frequency synthesizer 104 provides a receiver in-phase local oscillator signal $LO_{RI}$ and a receiver quadrature-phase local oscillator signal $LO_{RQ}$ to the integrated RF bandpass filter and down converter 102, which includes the RF mixer 10 and polyphase reactive circuitry 12 that provides bandpass functionality and provides down converted IF outputs, which provide in-phase and quadrature-phase down converted output signals $IF_{OUTI}$, $IF_{OUTQ}$. The integrated RF bandpass filter and down converter 102 and the output impedance of the LNA 100 form a second receiver RF bandpass filter, which is used to reject received interfering signals and RF transmitter signals outside the passband of the second receiver RF bandpass filter.

Those skilled in the art will recognize improvements and modifications to the preferred embodiments of the present invention. All such improvements and modifications are considered within the scope of the concepts disclosed herein and the claims that follow.

What is claimed is:

1. A radio frequency (RF) circuit comprising:
polyphase reactive circuitry comprising transconductance circuitry; and
mixer circuitry comprising:
at least one mixer input adapted to:
receive at least one mixer input signal; and
provide at least one mixer input impedance:
based on at least one impedance presented by the polyphase reactive circuitry and mixing the at least one mixer input signal with at least four local oscillator signals having a common local oscillator frequency, wherein an active state of each of the at least four local oscillator signals does not substantially overlap with an active state of any other local oscillator signal; and
having at least one impedance peak comprising an impedance quality factor greater than twenty; and
at least one mixer output based on the mixing and coupled to the polyphase reactive circuitry; and
wherein the one of the at least one impedance peak comprises a maximum impedance at a first frequency, which is shifted from the common local oscillator frequency such that the shifting is based on the transconductance circuitry.

2. A radio frequency (RF) circuit comprising:
polyphase reactive circuitry; and
mixer circuitry comprising:
at least one mixer input adapted to:
receive at least one mixer input signal; and
provide at least one mixer input impedance:

based on at least one impedance presented by the polyphase reactive circuitry and mixing the at least one mixer input signal with at least four local oscillator signals having a common local oscillator frequency, wherein an active state of each of the at least four local oscillator signals does not substantially overlap with an active state of any other local oscillator signal; and having at least one impedance peak comprising an impedance quality factor greater than twenty; and at least one mixer output based on the mixing and coupled to the polyphase reactive circuitry wherein the impedance quality factor:
is based upon the polyphase reactive circuitry and the mixing;
comprises an impedance bandwidth approximately equal to a first frequency minus a second frequency, wherein one of the at least one impedance peak comprises:
a maximum impedance at a third frequency;
a first impedance at the first frequency, such that the first impedance is approximately equal to one-half the maximum impedance, and the first frequency is greater than the third frequency; and
a second impedance at the second frequency, such that the second impedance is approximately equal to one-half the maximum impedance, and the second frequency is less than the third frequency; and
is approximately equal to the third frequency divided by the impedance bandwidth.

3. The RF circuit of claim 1 wherein the impedance quality factor is greater than fifty.

4. The RF circuit of claim 1 further comprising at least one differential signal.

5. The RF circuit of claim 1 wherein the mixer circuitry comprises at least one passive mixer.

6. The RF circuit of claim 1 wherein the mixer circuitry and the polyphase reactive circuitry substantially transfer any energy received into the at least one mixer input back out the at least one mixer input and out any signal outputs.

7. The RF circuit of claim 1 wherein one of the at least one impedance peak comprises a maximum impedance at a first frequency, and the first frequency is approximately equal to the common local oscillator frequency.

8. The RF circuit of claim 1 wherein the shifting is used to reject signals at an image frequency that is associated with the mixer circuitry.

9. The RF circuit of claim 1 wherein the shifting is further based on at least one transconductance provided by the transconductance circuitry.

10. The RF circuit of claim 1 wherein the mixer circuitry further comprises at least one down conversion output based on the mixing.

11. The RF circuit of claim 10 wherein a frequency of one of the at least one impedance peak is self-tuning.

12. The RF circuit of claim 1 wherein the polyphase reactive circuitry comprises at least one capacitive element.

13. The RF circuit of claim 1 further comprising an upstream impedance circuit adapted to receive at least one filter input signal and coupled to the at least one mixer input to form a filter.

14. The RF circuit of claim 13 wherein the coupling of the upstream impedance circuit to the at least one mixer input is adapted to provide at least one filter output signal.

15. The RF circuit of claim 13 wherein the upstream impedance circuit comprises at least one resistive element.

16. The RF circuit of claim 13 wherein the upstream impedance circuit is provided from at least one output impedance of an amplifier.

17. The RF circuit of claim 13 wherein the impedance quality factor is based on at least one resistance provided by the upstream impedance circuit.

18. The RF circuit of claim 17 wherein the impedance quality factor further comprises an impedance bandwidth, which is based on the at least one resistance provided by the upstream impedance circuit.

19. The RF circuit of claim 1 wherein the at least one mixer input signal is provided from at least one current source.

20. The RF circuit of claim 1 wherein:
the at least four local oscillator signals further comprise a first in-phase local oscillator signal, a second in-phase local oscillator signal, a first quadrature-phase local oscillator signal phase-shifted approximately 90 degrees from the first in-phase local oscillator signal, and a second quadrature-phase local oscillator signal; and
the mixer circuitry further comprises:
at least one in-phase mixer comprising:
at least one in-phase mixer input adapted to:
receive at least one in-phase mixer input signal; and
provide at least one in-phase mixer input impedance:
based on at least one in-phase impedance presented by the polyphase reactive circuitry, and in-phase mixing the at least one in-phase mixer input signal with the first and second in-phase local oscillator signals; and
having at least one in-phase impedance peak; and
at least one in-phase mixer output based on the in-phase mixing, and coupled to the polyphase reactive circuitry; and
at least one quadrature-phase mixer comprising:
at least one quadrature-phase mixer input adapted to:
receive at least one quadrature-phase mixer input signal; and
provide at least one quadrature-phase mixer input impedance:
based on at least one quadrature-phase impedance presented by the polyphase reactive circuitry, and quadrature-phase mixing the at least one quadrature-phase mixer input signal with the first and second quadrature-phase local oscillator signals; and
having at least one quadrature-phase impedance peak; and
at least one quadrature-phase mixer output based on the quadrature-phase mixing, and coupled to the polyphase reactive circuitry.

21. The RF circuit of claim 20 further comprising transconductance circuitry coupled to the polyphase reactive circuitry.

22. The RF circuit of claim 20 wherein the at least one in-phase mixer further comprises at least one in-phase down conversion output based on the in-phase mixing, and the at least one quadrature-phase mixer further comprises at least one quadrature-phase down conversion output based on the quadrature-phase mixing.

23. A radio frequency (RF) circuit comprising:
polyphase reactive circuitry, comprising transconductance circuitry;
at least one in-phase mixer comprising:
at least one in-phase mixer input adapted to:
receive at least one in-phase mixer input signal; and
provide at least one in-phase mixer input impedance:

based on at least one in-phase impedance presented by the polyphase reactive circuitry and in-phase mixing the at least one in-phase mixer input signal with a first in-phase local oscillator signal and a second in-phase local oscillator signal, wherein an active state of the first in-phase local oscillator signal does not substantially overlap an active state of the second in-phase local oscillator signal; and having at least one in-phase impedance peak comprising an in-phase impedance factor greater than twenty; and at least one in-phase mixer output based on the in-phase mixing, and coupled to the polyphase reactive circuitry; and at least one quadrature-phase mixer comprising:

at least one quadrature-phase mixer input adapted to:

receive at least one quadrature-phase mixer input signal; and provide at least one quadrature-phase mixer input impedance:

based on at least one quadrature-phase impedance presented by the polyphase reactive circuitry and quadrature-phase mixing the at least one quadrature-phase mixer input signal with a first quadrature-phase local oscillator signal and a second quadrature-phase local oscillator signal, wherein an active state of the first quadrature-phase local oscillator signal does not substantially overlap an active state of the second quadrature-phase local oscillator signal; and having at least one quadrature-phase impedance peak, comprising a quadrature-phase impedance factor greater than twenty; and at least one quadrature-phase mixer output based on the quadrature-phase mixing, and coupled to the polyphase reactive circuitry, wherein the first quadrature-phase local oscillator signal is phase-shifted approximately 90 degrees from the first in-phase local oscillator signal; and wherein the one of the at least one impedance peak comprises a maximum impedance at a first frequency, which is shifted from the common local oscillator frequency such that the shifting is based on the transconductance circuitry.

24. A radio frequency (RF) circuit comprising:

receiving at least one mixer input signal into at least one mixer input;

mixing the at least one mixer input signal with at least four local oscillator signals having a common local oscillator frequency, wherein an active state of each of the at least four local oscillator signals does not substantially overlap with an active state of any other local oscillator signal; and providing at least one mixer input impedance at the at least one mixer input based on the mixing and polyphase reactive circuitry comprising transconductance circuitry, which is coupled to the mixer circuitry, wherein the at least one mixer input impedance has at least one impedance peak comprising an impedance quality factor greater than twenty wherein the one of the at least one impedance peak comprises a maximum impedance at a first frequency, which is shifted from the common local oscillator frequency such that the shifting is based on the transconductance circuitry.

\* \* \* \* \*